United States Patent
Larjo

(10) Patent No.: US 10,695,890 B2
(45) Date of Patent: Jun. 30, 2020

(54) METHOD AND APPARATUS FOR CONTROLLING SHOT PEENING

(71) Applicant: Oseir Oy, Tampere (FI)

(72) Inventor: Jussi Pekka Larjo, Tampere (FI)

(73) Assignee: OSEIR OY, Tampere (FI)

( * ) Notice: Subject to any disclaimer, the term of this patent is extended or adjusted under 35 U.S.C. 154(b) by 0 days.

(21) Appl. No.: 16/307,974

(22) PCT Filed: Sep. 5, 2017

(86) PCT No.: PCT/FI2017/050623
§ 371 (c)(1),
(2) Date: Dec. 7, 2018

(87) PCT Pub. No.: WO2018/046795
PCT Pub. Date: Mar. 15, 2018

(65) Prior Publication Data
US 2019/0299361 A1 Oct. 3, 2019

(30) Foreign Application Priority Data
Sep. 12, 2016 (FI) ..................... 20165678

(51) Int. Cl.
B24C 1/10 (2006.01)
B24C 7/00 (2006.01)
(Continued)

(52) U.S. Cl.
CPC ............ *B24C 1/10* (2013.01); *B24C 1/00* (2013.01); *B24C 7/00* (2013.01); *C21D 7/06* (2013.01); *G01P 3/68* (2013.01)

(58) Field of Classification Search
CPC .... B24C 1/10; B24C 7/00; C21D 7/06; G01P 3/68
See application file for complete search history.

(56) References Cited

U.S. PATENT DOCUMENTS 5,212,976 A 5/1993 Company
5,507,172 A 4/1996 Thompson et al.
(Continued)

FOREIGN PATENT DOCUMENTS

JP 2016-049571 A 4/2016
JP 2017-226024 A 12/2017

OTHER PUBLICATIONS

Miao Et al., Experimental Study of Shot Peening and Stress Peen Forming, In: Journal of Materials Processing Technology. Elsevier B.V. 2010. vol. 210. pp. 2089-2102.
Steen, Laser Material Processing. 3rd Edition. Springer-Verlag London Limited. 2005. pp. 41-45.
(Continued)

*Primary Examiner* — Dung Van Nguyen
(74) *Attorney, Agent, or Firm* — Ziegler IP Law Group, LLC

(57) ABSTRACT

A shot peening process may be controlled by
using a shot peening unit to provide a particle jet,
exposing one or more test strips to the particle jet,
measuring one or more deformation values of the test strips,
illuminating at least a portion of the particle jet with illuminating light,
capturing images of said portion,
determining at least one velocity value of the particle jet by analyzing the captured images, and
determining a model based on the one or more deformation values and based on the at least one velocity value.

8 Claims, 17 Drawing Sheets

(51) Int. Cl.
*G01P 3/68* (2006.01)
*C21D 7/06* (2006.01)
*B24C 1/00* (2006.01)

(56) References Cited

U.S. PATENT DOCUMENTS

| | | | |
|---|---|---|---|
| 5,691,483 | A | 11/1997 | Linnemann |
| 6,023,324 | A | 2/2000 | Myers |
| 6,905,396 | B1 * | 6/2005 | Miller ..................... B24C 1/086 451/38 |
| 6,930,769 | B1 * | 8/2005 | Davis ........................ G01J 1/08 250/200 |
| 2013/0074305 | A1 | 3/2013 | Tolentino |
| 2017/0261370 | A1 * | 9/2017 | Poret ....................... G01N 21/01 |
| 2018/0222014 | A1 * | 8/2018 | Cyrek ....................... B24C 1/10 |

OTHER PUBLICATIONS

International Search Report, Application No. PCT/FI2017/050623, dated Dec. 11, 2017, 4 pages.
Written Opinion of the International Search Authority, Application No. PCT/FI2017/050623, dated Dec. 13, 2017, 3 pages.
Office Action of Finnish Patent and Registration Office, Application No. 20165678 dated Apr. 13, 2017, 5 pages.
Notification of Reason for Refusal issued in JP Application No. JP2018569074 on Oct. 17, 2019, 8 pages.
Marvin B Happ et al: "Almen Strip Variability—a statistical treatment", The Shot Peener, Dec. 31, 1996, pp. 1-10, XP055242648, retrieved from the internet on Jan. 19, 2016: URL: http//www.shotpeener.com/library/pdf/1996078.pdf.
Extended European Search Report, Application 17848209.7-1019/3448625 PCT/FI2017050623, dated Nov. 28, 2019.

* cited by examiner

METHOD AND APPARATUS FOR CONTROLLING SHOT PEENING

FIELD

The aspects of the disclosed embodiments relate to controlling shot peening.

BACKGROUND

Shot peening may be used for processing the surfaces of critical metallic components, e.g. gas turbine blades, toothed gears, or axles. A shot peening process may be verified by using so called Almen strips. The use of Almen strips may involve considerable amount of manual work.

SUMMARY

Some versions may relate to verification of a shot peening apparatus. Some versions may relate to a device for verifying a shot peening process. Some versions may relate to monitoring operation of a shot peening apparatus. Some versions may relate to a device for monitoring a shot peening process. Some versions may relate to controlling operation of a shot peening apparatus. Some versions may relate to a device for controlling a shot peening process. Some versions may relate to a shot peening apparatus, which comprises an optical device for verifying operation of the shot peening apparatus.

According to an aspect, there is provided a method, comprising:
using a first shot peening unit to provide a particle jet,
exposing one or more test strips to the particle jet such that the first shot peening unit provides a particle jet according to a first set of operating parameters,
measuring one or more first deformation values of the test strips,
illuminating at least a portion of the particle jet with illuminating light,
capturing images of said portion during a measurement time period, wherein the first shot peening unit provides a particle jet according to said first set of operating parameters during said measurement time period,
determining at least one velocity value of particles of the particle jet by analyzing the captured images, and
determining a model based on the one or more first deformation values and based on the at least one velocity value.

According to an aspect, there is provided a method, comprising:
providing a model which establishes a relationship between a velocity value of a particle jet and a deformation value,
using a first shot peening unit to provide a particle jet,
illuminating at least a portion of the particle jet with illuminating light,
capturing images of said portion,
determining one or more velocity values of particles of the particle jet by analyzing the captured images,
determining an estimate of an arc height value from the one or more velocity values by using the model, and
classifying a shot peening operation as valid or invalid by checking whether the estimate of the arc height value is in a predetermined range.

According to an aspect, there is provided a method, comprising:
providing a model which establishes a relationship between a velocity value of a particle jet and a deformation value,
using a first shot peening unit to provide a particle jet,
illuminating at least a portion of the particle jet with illuminating light,
capturing images of said portion,
determining at least one velocity value of particles of the particle jet by analyzing the captured images, and
adjusting one or more operating parameters of the shot peening unit based on the velocity value.

According to an aspect, there is provided an apparatus, comprising:
an illuminating unit to provide an illuminating light beam,
an image sensor to capture images of a particle jet illuminated by the illuminating light beam, and
an interface to receive one or more deformation values,
wherein the apparatus is configured to determine one or more velocity values of particles of the particle jet by analyzing the captured images, and to determine a model based on the one or more first deformation values and based on the one or more velocity values.

The method may comprise:
using a shot peening unit (700) to provide a particle jet (JET1),
exposing one or more test strips (S1) to the particle jet (JET1),
measuring one or more deformation values ($h_{AS}$) of the test strips (S1),
illuminating at least a portion (RG0) of the particle jet (JET0) with illuminating light (LB0),
capturing images (IMG2) of said portion (RG0),
determining at least one velocity value ($v_{AVE}$, $v_{RMS}$) of the particle jet (JET1) by analyzing the captured images (IMG2), and
determining a model (MODEL1) based on the one or more deformation values ($h_{AS}$) and based on the at least one velocity value ($v_{AVE}$, $v_{RMS}$).

The shot peening unit may be arranged to provide a particle jet, which comprises particles moving at a high velocity. The particle jet may be directed to an object so as to process the surface of said object by shot peening.

The monitoring device may comprise an illuminating unit and an imaging unit. The illuminating unit may illuminate a predetermined region of the particle jet. The imaging unit may capture digital images of particles located within the illuminated region. The method may comprise estimating an arc height value ($h_{AS}$) and/or a time equivalent value ($T_{INT}$) by analyzing the captured digital images. The device may comprise a data processing unit, which may be configured to analyze the captured images.

The capability of the particle jet to cause irreversible plastic deformation of a surface may be quantitatively measured by using the test strip AS1, which may also be called e.g. as the Almen strip. Arc height values and/or time equivalent values may be measured by exposing the test strip to the particle jet such that the particle jet causes bending of the test strip. The shape of the test strip AS1 after a shot peening test may be defined e.g. by an arc height value $h_{AS}$.

The method may comprise measuring at least one velocity value by analyzing the captured images. The method may comprise determining a model, which describes a relationship between measured velocity values and the corresponding arc height values. The model may be determined based on measured arc height values and based on measured velocity values.

The method may comprise measuring at least one velocity value by analyzing the captured images. A corresponding deformation of an Almen strip may be subsequently estimated from the measured velocity value by using the model, without deforming the Almen strip.

The monitoring device may provide one or more measured velocity values based on a high number of detected particles. The measurement result may be based on a statistically meaningful portion of all particles which impinge on a target during a shot peening process. Analysis of the captured images may provide a statistically meaningful result within a reasonable time.

The present method may allow substantially continuous monitoring during a shot peening process. The present method may allow detecting transient disturbances of the jet. The present method may allow reducing the amount of manual work needed for handling the Almen strips. The present method may also allow determining the coverage of the particle jet.

Thanks to using the present imaging method, the use of the test strips may be reduced or avoided. Estimating the arc height values $h_{AS}$ by using the measurement device and by using the model may reduce the number of test strips AS1 needed for verifying a shot peening process. The operation of the shot peening unit may be monitored and/or verified before as shot peening process, during the shot peening process and/or after the shot peening process. The operation of the shot peening unit may be monitored and/or verified in real time. The need for manual work may be reduced or avoided. The operation of the shot peening unit may be monitored several times during a shot peening process or even continuously without increasing the amount of manual work needed for the monitoring. The verification may be performed more often and/or with a higher accuracy. Consequently, the quality of a shot peened product may be improved.

Estimating the arc height values $h_{AS}$ by using the measurement device and by using the model may allow on-line control of a shot peening process.

BRIEF DESCRIPTION OF THE DRAWINGS

In the following examples, several variations will be described in more detail with reference to the appended drawings, in which.

DETAILED DESCRIPTION

Figure 1:
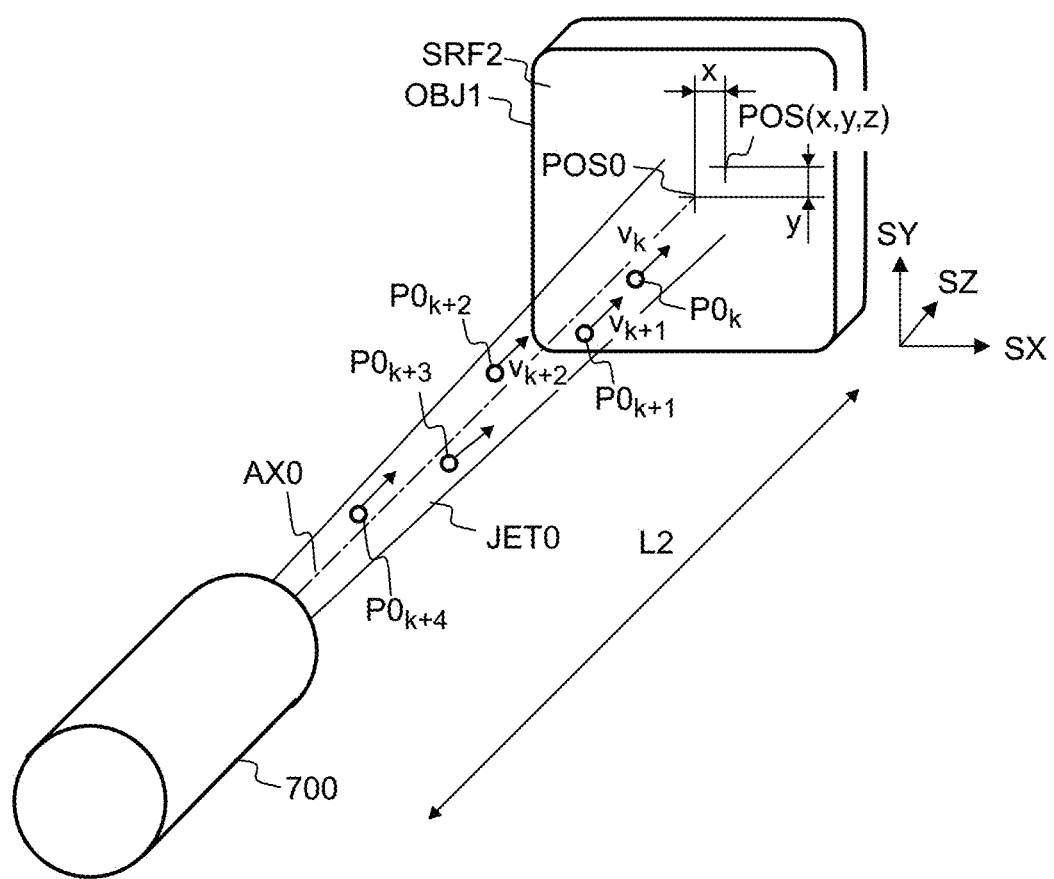
FIG. 1 shows, by way of example, in a three dimensional view, processing a surface of an object by shot peening.

Referring to FIG. 1, the surface SRF2 of an object OBJ1 may be processed by shot peening.

Shot peening may be used. e.g. for increasing the operating life of a component OBJ1, which is intended for use in demanding conditions. Shot peening may produce compressive residual stress in the surface layer SRF2 of the component OBJ1. The compressive stress may reduce the risk of propagation of microscopic cracks in the surface layer SRF2. Shot peening may increase operating life of the parts, e.g. by reducing the risk of fatigue failure.

Shot peening may be performed by accelerating macroscopic particles P0 to a high velocity, and directing the moving particles P0 to the surface SRF2 of an object OBJ1. The particles P0 may hit the surface SRF2 and may cause plastic deformation of the surface layer of the object. The moving particles P0 may be called e.g. as the "shots". The particles may be e.g. steel balls or ceramic balls. Shot peening may comprise providing a particle jet JET0, which comprises a plurality of particles $P0_k$, $P0_{k+1}$, $P0_{k+2}$, . . . moving at high velocities $v_k$, $v_{k+1}$, $v_{k+2}$, . . . . A shot peening unit 700 may be arranged to provide the particle jet JET0. The particle jet JET0 may be provided e.g. by accelerating the particles with a high velocity gas stream. The particle jet JET0 may also be provided e.g. by accelerating the particles with a rotating mechanical element.

The object OBJ1 may also be called e.g. as a target. The surface SRF2 may be exposed to particles of a particle jet JET0. A shot peening unit 700 may be arranged to provide the particle jet JET0. The jet JET0 may comprise a plurality of particles $P0_k$, $P0_{k+1}$, $P0_{k+2}$, . . . . The particles may be e.g. metal balls, pieces of metal wire, or ceramic beads. In particular, the particles may be steel balls.

The jet may be directed to the surface SRF2 of the target. The target OBJ1 may be e.g. a part of a machine, engine and/or a vehicle. The target OBJ1 may be e.g. a mechanical component of a device.

The particle jet JET0 may have central axis AX0. The particles of the jet may propagate substantially in the direction of the axis AX0. The jet may also be slightly diverging such that the particles have a significant velocity component in the direction of the axis AX0.

SX, SY, and SZ denote orthogonal directions. The axis AX0 of the jet may be parallel e.g. with the direction SZ. The reference position POS0 denotes a point where the axis AX0 intersects the surface of the object. POS(x,y,z) may denote an arbitrary position. The position POS(x,y,z) may be specified e.g. by coordinates x,y,z with respect to the reference position POS0.

L2 denotes a distance between the shot peening unit 700 and the surface SRF2. In particular, L0 may denote a distance between the accelerating nozzle of the shot peening unit 700 and the surface SRF2. The position of the shot peening unit 700 and/or the orientation of the target OBJ1 may be selected such that the surface SRF2 is substantially perpendicular to the axis AX0.

Figure 2A:
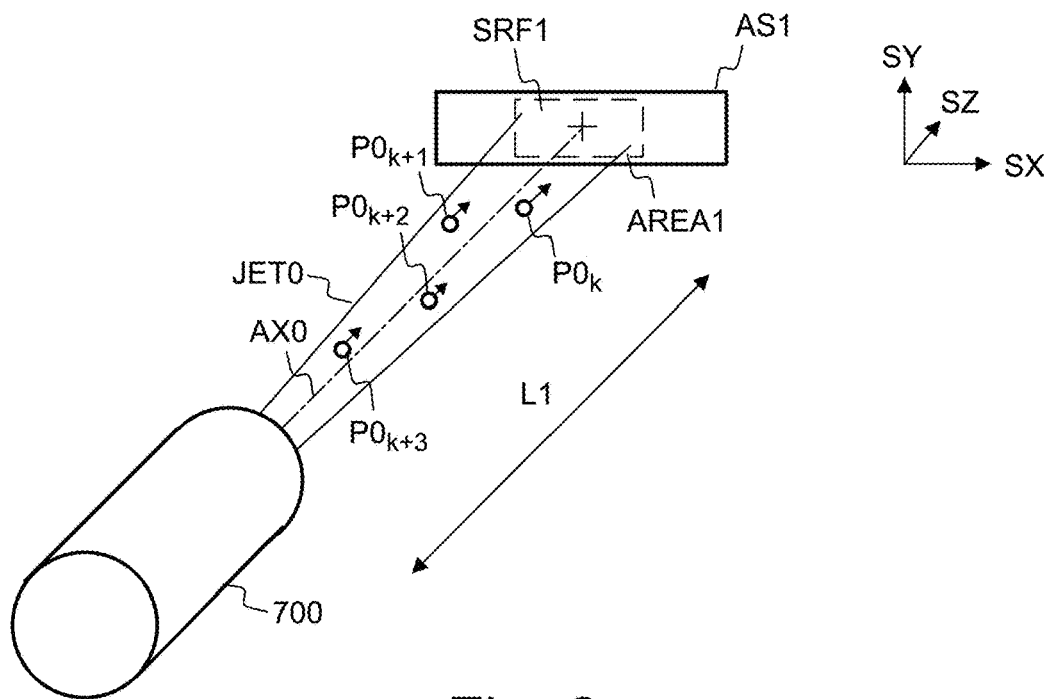
FIG. 2a shows, by way of example, in a three dimensional view, exposing a test strip to the particle jet.

Referring to FIG. 2a, the capability of a particle jet JET0 to cause peening may be measured experimentally by using a test strip AS1. The test strip may be called e.g. as the Almen strip. The capability of the particle jet to cause the plastic deformation may be quantitatively measured by using the test strip AS1. The efficiency of the particle jet JET0 may be measured by using the test strip AS1. The impacts of the particles may cause bending of a test strip so that the test strip AS1 forms an arc. The height ($h_{AS}$) of the arc may depend on the operating parameters of the shot peening unit 700, on the distance (L1) between the shot peening unit 700, and on the duration of the peening.

The dimensions of the test strips AS1 and/or the details of the experimental set-up may be defined e.g. in a standard SAE J442, J443, J2277, J2597, AMS2430, and/or AMS2432. SAE means Society of Automotive Engineers, an organization based in the United States of America.

The particles may hit an exposed area AREA1 of the surface SRF1 of the test strip AS1. L1 may denote the distance between the shot peening unit 700 and the test strip AS1. In particular, L0 may denote the distance between the particle accelerating nozzle of the shot peening unit 700 and the reference area AREA0. The axis of the particle jet JET0 may coincide with the center of the area AREA1.

Figure 2B:
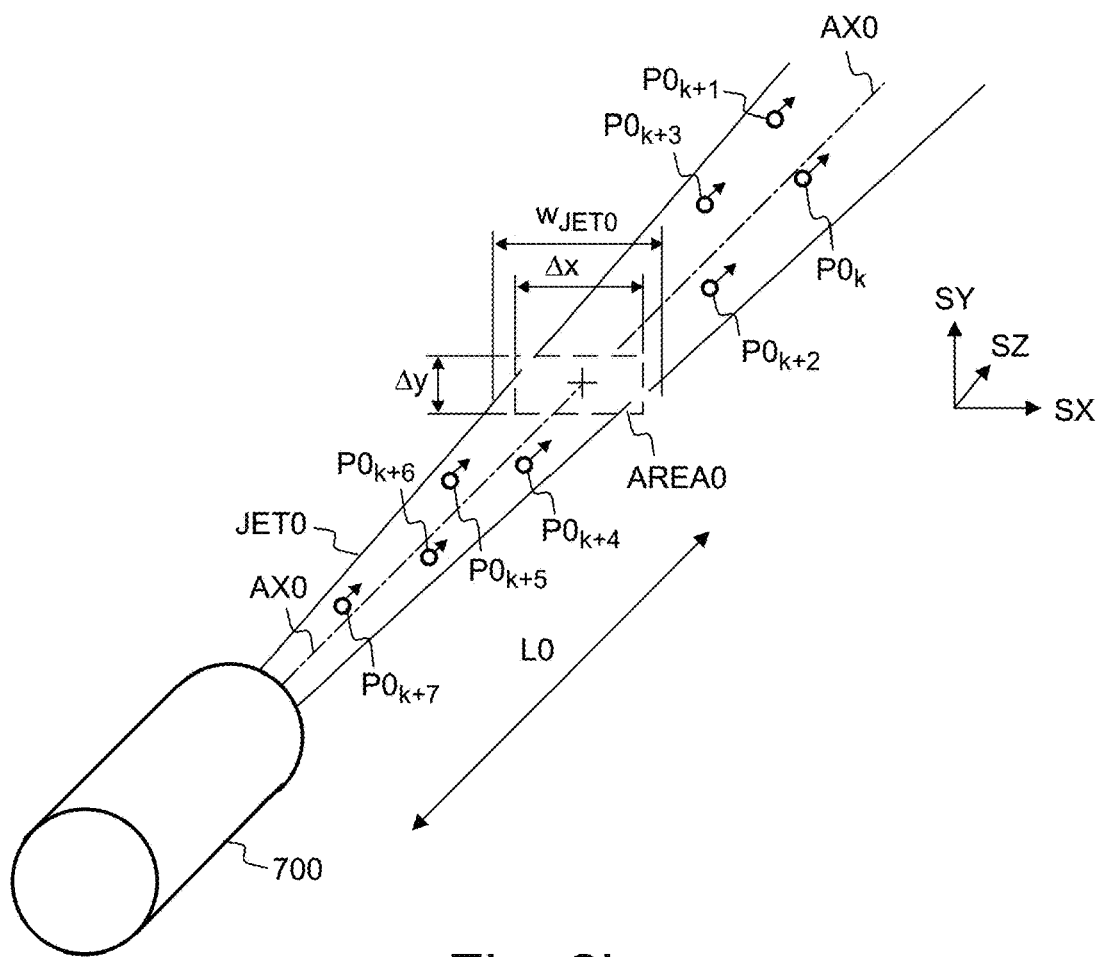
FIG. 2b shows, by way of example, in a three dimensional view, particles passing through a reference area.

Referring to FIG. 2b, the shot peening unit 700 may provide a particle flux through a reference area AREA0. L0 may denote the distance between the shot peening unit 700 and the reference area AREA0. In particular, L0 may denote the distance between the particle accelerating nozzle and the reference area AREA0. The reference area AREA0 may have e.g. a width $\Delta x$ and a height $\Delta y$. The reference area AREA0 may be perpendicular to the axis AX0 of the particle jet. The measuring device 500 may be arranged to measure the total kinetic energy of particles which pass through the reference area AREA0 during a measurement time period $T_{MEAS}$. The measuring device 500 may be arranged to capture images of particles which pass through the reference area AREA0. The measuring device 500 may be arranged to monitor the particle jet in the vicinity of the reference area AREA0.

The reference area AREA0 may be positioned e.g. such that the distance L0 is substantially equal to the distance L1. The size of the reference area AREA0 may be equal to the exposed area AREA1 of the test strip AS1. The width $\Delta x$ of the reference area AREA0 may be equal to the width of the exposed area AREA1 of the test strip AS1, and the height $\Delta y$ of the reference area AREA0 may be equal to the height of the exposed area AREA1 of the test strip AS1. The jet may have a diameter ($w_{JET0}$) at the position of the reference area AREA0.

Figure 3A:
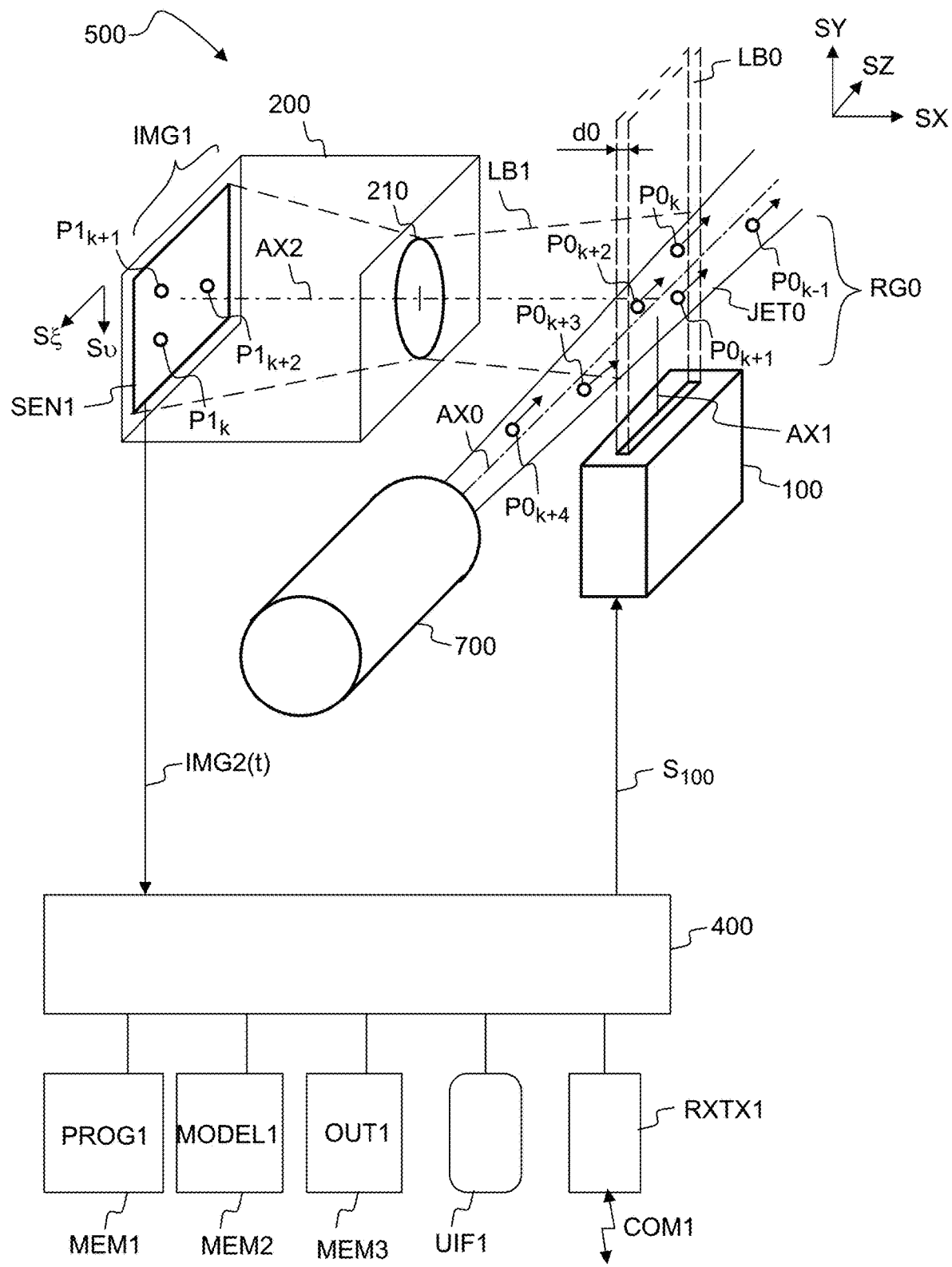
FIG. 3a shows, by way of example, in a three dimensional view, an optical measuring device arranged to capture images of particles of the particle jet.

Referring to FIG. 3a, the measuring device 500 may comprise an illuminating unit 100, an imaging unit 200, and a data processing unit 400. The illuminating unit 100 may be arranged illuminate a predetermined region RG0 of the particle jet JET0. The imaging unit 200 may be arranged to capture digital images IMG2 of particles located within the illuminated region RG0. The imaging unit 200 may be arranged to capture a plurality of images at a high frame rate. The imaging unit 200 may be a video camera.

Figure 5A:
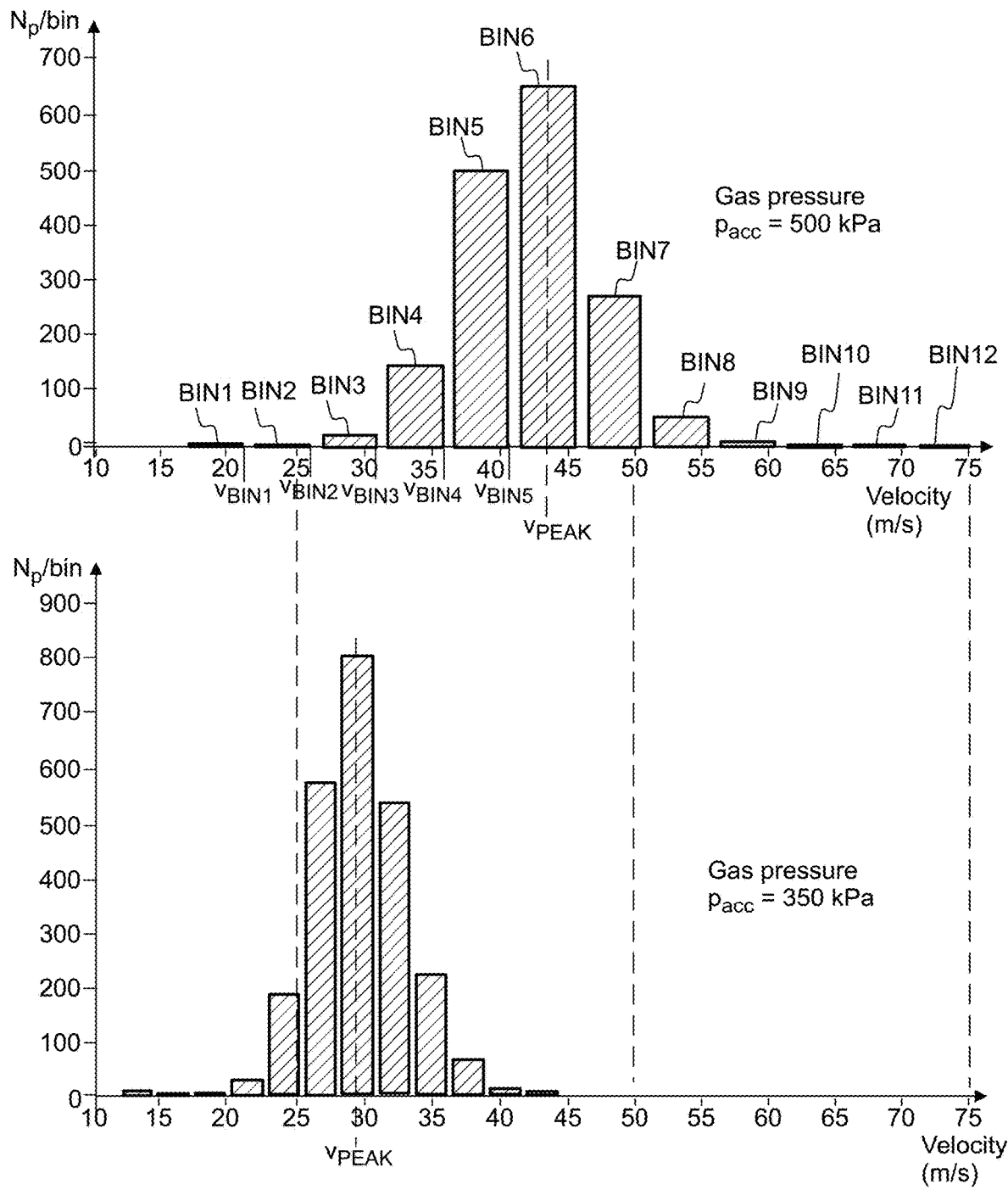
FIG. 5a shows, by way of example, a first velocity distribution associated with a first value of an operating parameter, and a second velocity distribution corresponding to a second value of said operating parameter.
Figure 5B:
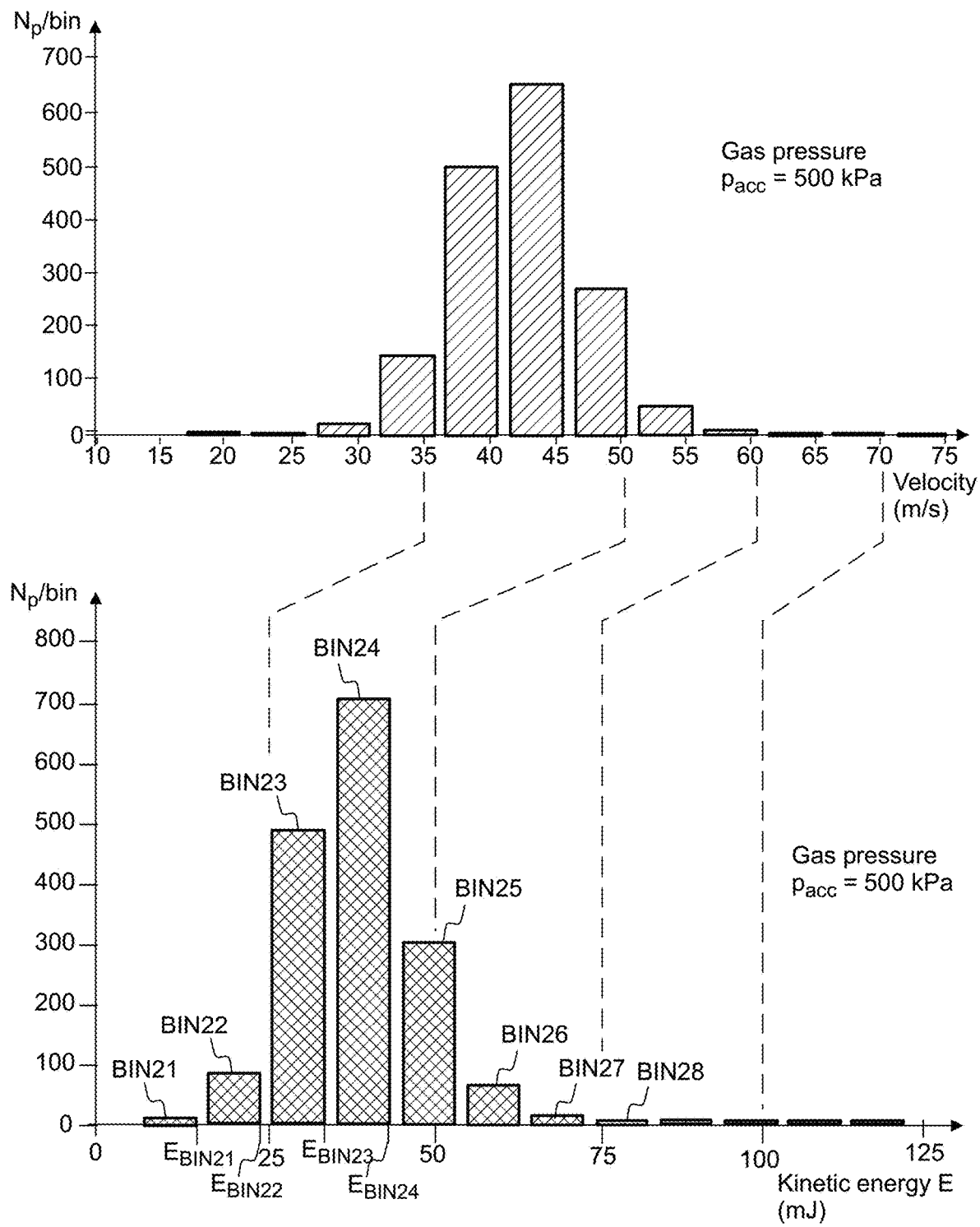
FIG. 5b shows, by way of example, a measured velocity distribution and an energy distribution corresponding to the measured velocity distribution.
Figure 5C:
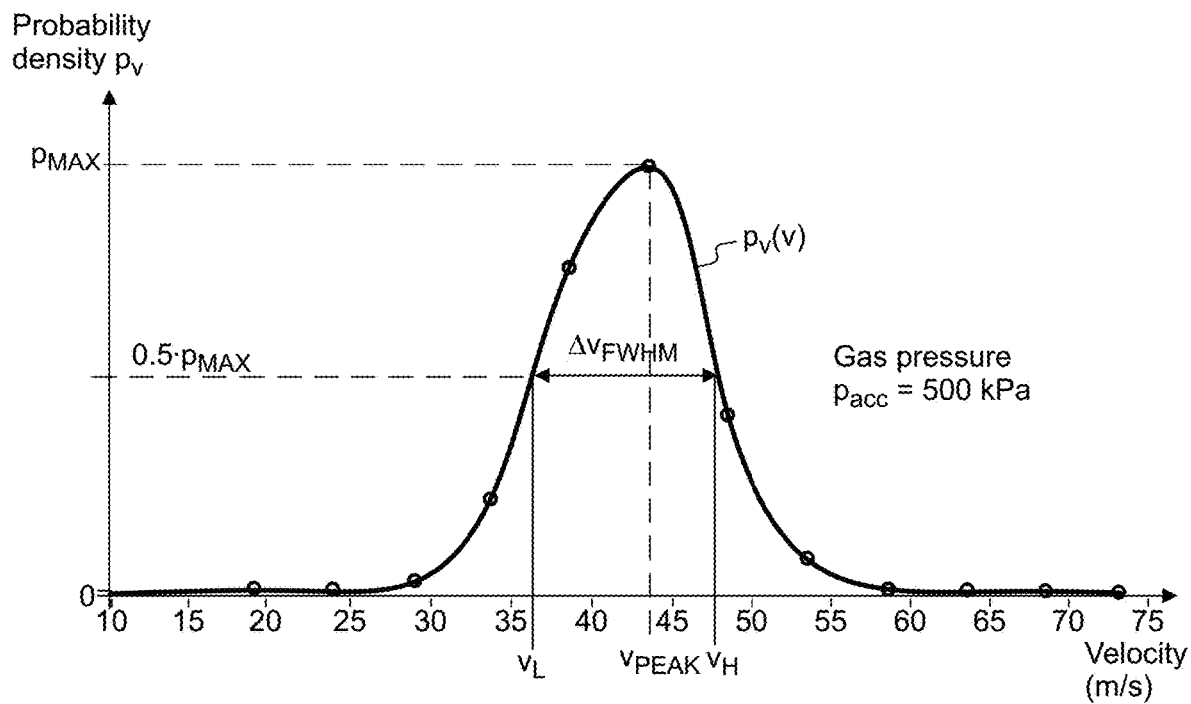
FIG. 5c shows, by way of example, a velocity distribution function and an energy distribution function.
Figure 5D:
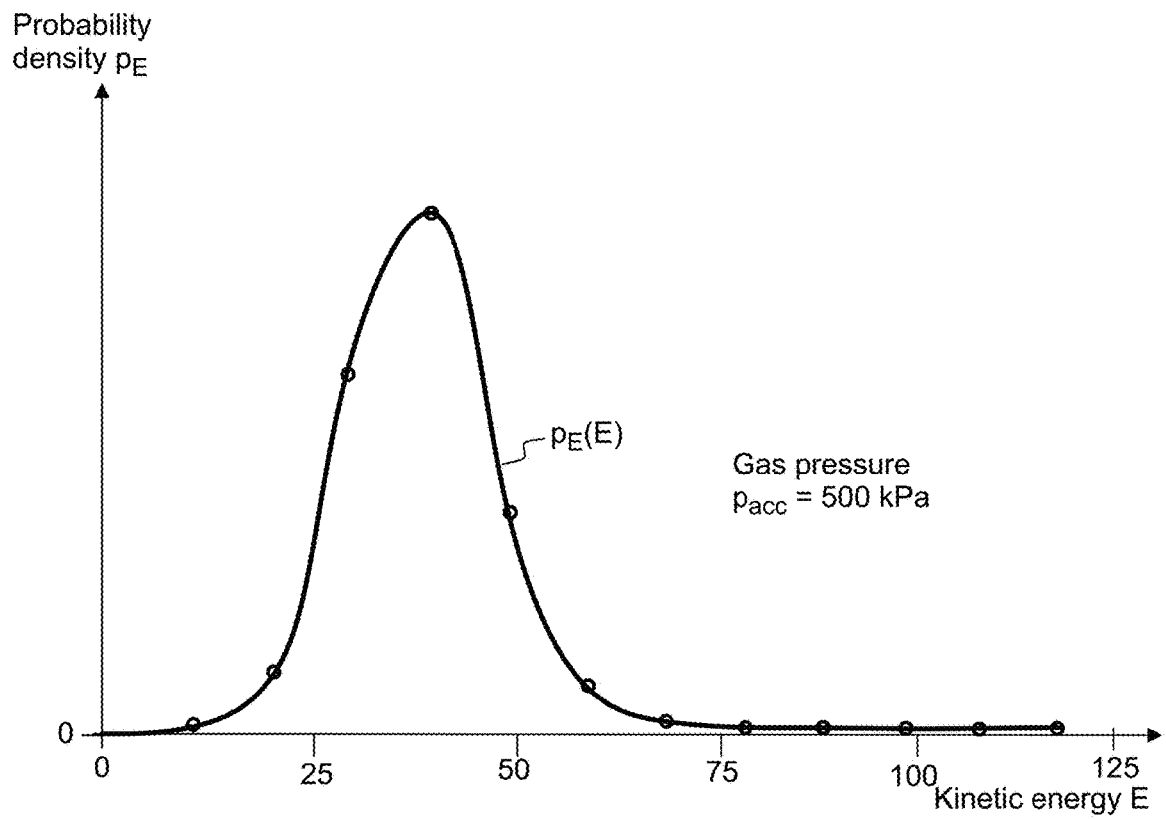
FIG. 5d shows, by way of example, a probability density function pE(E)
Figure 5E:
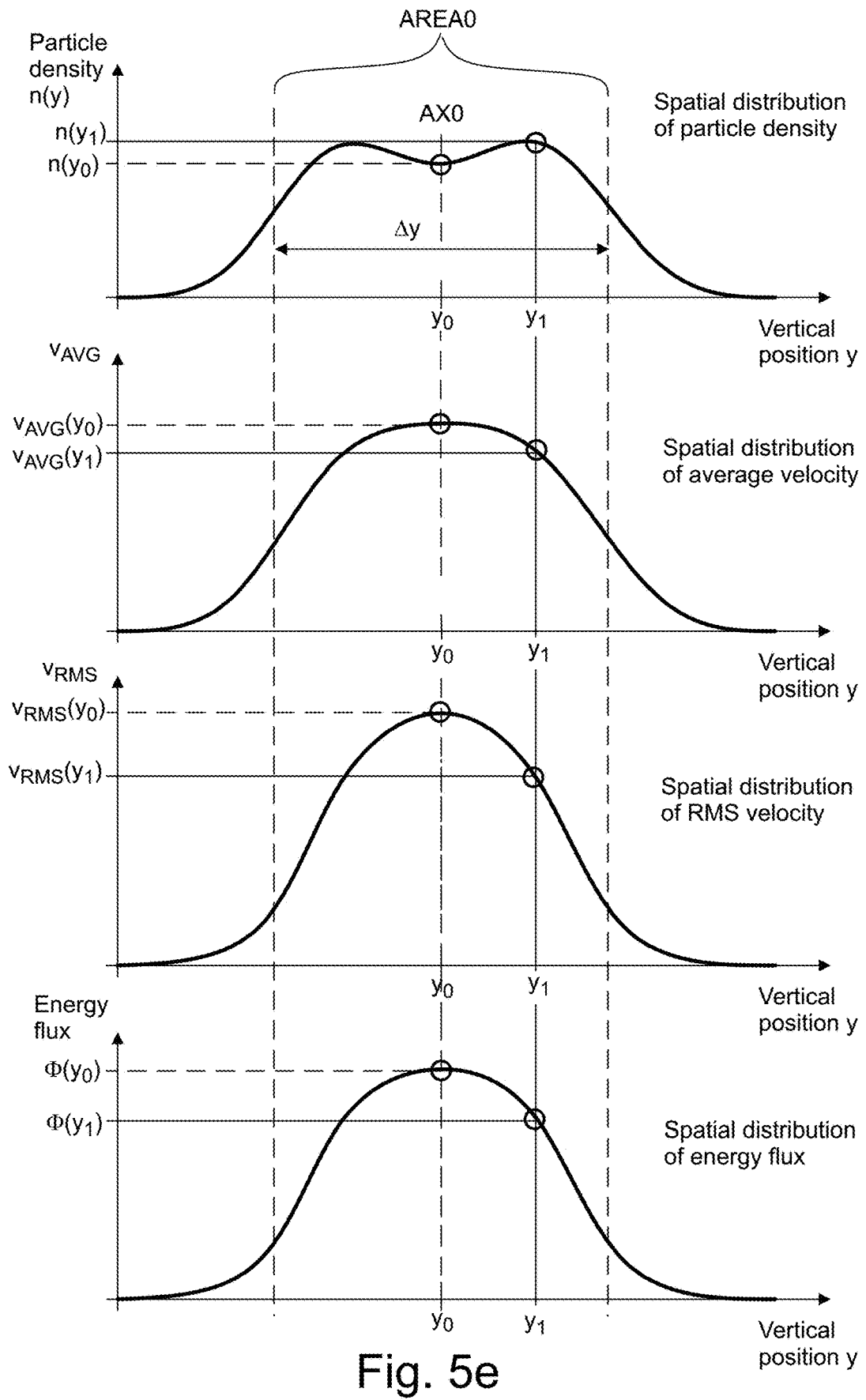
FIG. 5e shows, by way of example, spatial distribution of particle density, spatial distribution of average velocity, spatial distribution of RMS velocity, and spatial distribution of energy flux.

The measuring device 500 may be arranged to measure one or more spatial distributions by analyzing the captured images (FIG. 5e). For example, the device 500 may be arranged to measure a spatial particle density distribution. The measuring device 500 may be arranged to measure a vertical density distribution by analyzing the captured images. The density distribution may provide e.g. particle density as a function of the vertical position with respect to the axis AX0 of the jet JET0. The vertical position may be specified e.g. by y-coordinate in the direction SY.

The measuring device 500 may be arranged to measure a spatial velocity distribution by analyzing the captured images. A particle P0 may have a velocity component $v_z$ in the axial direction SZ. The particle P0 may also have a transverse velocity component $v_x$ in the direction SX and/or a velocity component vy in the direction SY. The measuring device 500 may be arranged to measure e.g. the velocity components $v_z$ and $v_y$ for each particle appearing in a captured image. The measuring device 500 may be arranged to measure a spatial velocity distribution for the axial velocity components $v_z$ as a function of the vertical position y. The measuring device 500 may be arranged to measure a spatial velocity distribution for the transverse velocity components $v_y$ as a function of the vertical position y.

The measuring device 500 may be arranged to measure a spatial velocity probability distribution by analyzing the captured images.

The measuring device 500 may be arranged to measure a spatial distribution of mass flow by analyzing the captured images.

The measuring device 500 may be arranged to measure a spatial distribution of flux of kinetic energy by analyzing the captured images. The spatial distribution may provide information e.g. about an effective width of the particle jet.

The illuminating unit 100 may provide an illuminating light beam LB0. The particles P0 may reflect, refract and/or scatter light LB1 towards the illuminating unit 100. The particles P0 may provide reflected light LB1 by reflecting, refracting and/or scattering the illuminating light LB0.

The imaging unit 200 may comprise focusing optics 210 and an image sensor SEN1. The focusing optics 210 may be arranged to form an optical image IMG1 on an image sensor SEN1, by focusing the light LB1 received from the particles.

The image sensor SEN1 may convert one or more optical images IMG1 into a digital image IMG2. The data processing unit 400 may be configured to analyze one or more digital images IMG2 obtained from the image sensor SEN1. The data processing unit 400 may be configured to perform one or more data processing operations e.g. for determining a model, for verifying a shot peening operation, for controlling operation of the shot peening unit, and/or for providing an indication if one or more measured velocity values are outside a specified range. The image sensor SEN1 may be e.g. a CMOS sensor or a CCD sensor. CMOS means Complementary Metal Oxide Semiconductor. CCD means Charge Coupled Device. The image sensor SEN1 may comprise a plurality of light detector pixels arranged in a two-dimensional array. The digital image IMG2 may have a width $\xi_{IMG}$ and a height $\upsilon_{IMG}$ in the image space defined by directions S$\xi$ and S$\upsilon$. The image of the axis AX0 may be e.g. substantially parallel with the direction S$\xi$. The direction S$\upsilon$ may be perpendicular to the direction S$\xi$.

The field of view of the imaging unit may allow a considerable variation of the position of the particle jet. Thus, the position of the monitoring device of the does not need to be set with a high accuracy with respect to the axis of the particle jet.

The imaging unit 200 may have an optical axis AX2. The measurement region RG0 may have a thickness d0 in the direction of the optical axis AX0. The direction of the illuminating beam LB0 may be specified e.g. by an axis AX1.

The axis AX2 may be e.g. substantially perpendicular to the axis AX0 and substantially perpendicular to the axis AX1. The illuminating light beam LB0 may have e.g. a thickness d0 in the direction of the optical axis AX2. The illuminating unit 100 may be arranged to provide e.g. a substantially planar light beam. The illuminating light beam LB0 may be a light sheet. The illuminating unit 100 may comprise e.g. one or more lasers and/or light emitting diodes to provide the illuminating light beam LB0. Illuminating the jet by the light sheet may allow defining the thickness d0 and/or position of the measurement region RG0 accurately.

The method may comprise illuminating the particle jet JET0 with the illuminating light LB0 such that the thickness d0 of the measurement region RG0 is smaller than the diameter ($w_{JET0}$) of the particle jet JET0. Thus, each captured image may represent a single slice (RG0) of the particle jet. The method may comprise determining a two-dimensional and/or a three dimensional spatial velocity distribution of the particle jet by analyzing the captured images. The method may comprise determining a two-dimensional and/or a three dimensional spatial particle density distribution of the particle jet by analyzing the captured images. Using the thin (d0<$w_{JET0}$) measurement region (RG0) may facilitate determining the spatial distributions.

The illuminating unit 100 may be arranged to modulate the illuminating light beam LB0. The illuminating unit 100 may be arranged to modulate the optical intensity of the illuminating light beam LB0 according to control signal $S_{100}$. The measuring device 500 may be arranged to provide a control signal $S_{100}$ for modulating the illuminating light beam LB0. The control signal $S_{100}$ may comprise e.g. timing pulses for controlling timing of operation of the illuminating unit 100. The illuminating unit 100 may be arranged to provide one or more illuminating light pulses LB0.

The position of the illuminating unit 100 may be defined e.g. by a mechanical frame with respect to the imaging unit 200. The units 100, 200 may be attached to a common frame. The device 500 may optionally comprise a robot for setting the position of the illuminating unit 100 and/or for the position of the imaging unit 200. The device 500 may optionally comprise a robot for setting the position of the measurement region RG0 with respect to the shot peening unit 700.

The device 500 may comprise a memory MEM1 for storing computer program code PROG1. For example, the code PROG1 may, when executed by one or more data processors, cause a system or the device 500 to determine a total energy value by analyzing the images IMG2 captured by the imaging device 200. For example, the code PROG1 may, when executed by one or more data processors, cause a system or the device 500 to estimate an arc height value $h_{AS}$ by analyzing the images IMG2.

The device 500 may comprise a memory MEM2 for storing one or more parameters of a model MODEL1.

The device 500 may optionally comprise a memory MEM3 for storing one or more output values OUT1 determined by using the model MODEL1. The output values OUT1 may comprise e.g. one or more arc height values $h_{AS,1}$, $h_{AS,2}$, $h_{AS,3}$ and/or peening intensity rating values $T_{INT}$.

The device 500 may comprise a user interface UIF1 for receiving user input from a user and/or for providing information to a user. The user interface UIF1 may comprise e.g. a keypad or a touch screen for receiving user input. The user interface UIF1 may comprise e.g. a display for displaying visual information. The user interface UIF1 may comprise e.g. a display for displaying one or more parameter values determined by analyzing the images. The user interface UIF1 may comprise e.g. a display for displaying an indication when one or more parameters measured by the device are outside an acceptable range. The user interface UIF1 may comprise e.g. an audio output device for providing an indication if one or more velocity values measured by the device are outside an acceptable range. The user interface UIF1 may be configured to provide a visual alarm and/or an alarm sound if one or more velocity values measured by the device are outside an acceptable range.

The device 500 may comprise a communication unit RXTX1 for receiving and/or transmitting data. COM1 denotes a communication signal. The device 500 may be arranged to communicate e.g. with the shot peening unit 700 via the communication unit RXTX1. The device 500 may be arranged to communicate e.g. with a control unit of the shot peening unit 700 via the communication unit RXTX1. The device 500 may receive process data via the communication unit RXTX1. The process data may indicate e.g. when the shot peening unit is operating. The process data may indicate e.g. one or more process parameter values of the shot peening unit 700. The device 500 may send process control data via the communication unit RXTX1. The process control data may comprise e.g. data for adjusting one or more process parameters of the shot peening unit 700.

The device 500 may be arranged to receive measured data from a second measuring instrument via the communication unit RXTX1. The second measuring instrument may be e.g. an Almen gage.

The imaging unit 200 may form an image P1 of each particle P0, which is located in the measurement region RG0 during an exposure time $T_{ex}$ of the image sensor SEN1. The optical image IMG1 formed on the active area of the image sensor SEN1 may comprise a plurality of sub-images P1. Each sub-image P1 may be an image of a particle P0. The image sensor SEN1 may convert an optical image IMG1 into a digital (captured) image IMG2.

The image IMG2 captured by the imaging unit 200 may represent a region RG0 of the particle jet JET0. An average number of particles appearing in a single captured image may be e.g. in the range of 2 to 1000. An average number of particles appearing in a single captured image may be e.g. in the range of 10 to 100. The sub-images P1 of the particles P0 may be detected by an image analysis algorithm. The particles P0 may be moving at a high velocity during capturing of an image IMG2. The velocity of each particle appearing in a captured image may be determined from the displacement value $\Delta u$ and from the timing of the exposure and/or illumination. The optical image P1 of each particle P0 may move during capturing of the image IMG2. The movement of the optical image may define a displacement value $\Delta u$, which may be determined from the captured image IMG2 by image analysis. Each substantially sharp image P1 of a particle P0 may be associated with a displacement value $\Delta u$. The velocity $v_k$ of a particle $P0_k$ may be determined from the displacement value $\Delta u_k$ and from the duration $(T_F)$ of illumination and/or from the exposure time period $T_{ex}$.

When using illuminating pulse sequences, the velocity $v_k$ of a particle $P0_k$ may be determined from the displacement value $\Delta u_k$ and from the timing (e.g. t5–t1) of illuminating light pulses LB0. In particular, the axial velocity of a particle may be substantially proportional to $\Delta u_k/T_F$.

Figure 3B:
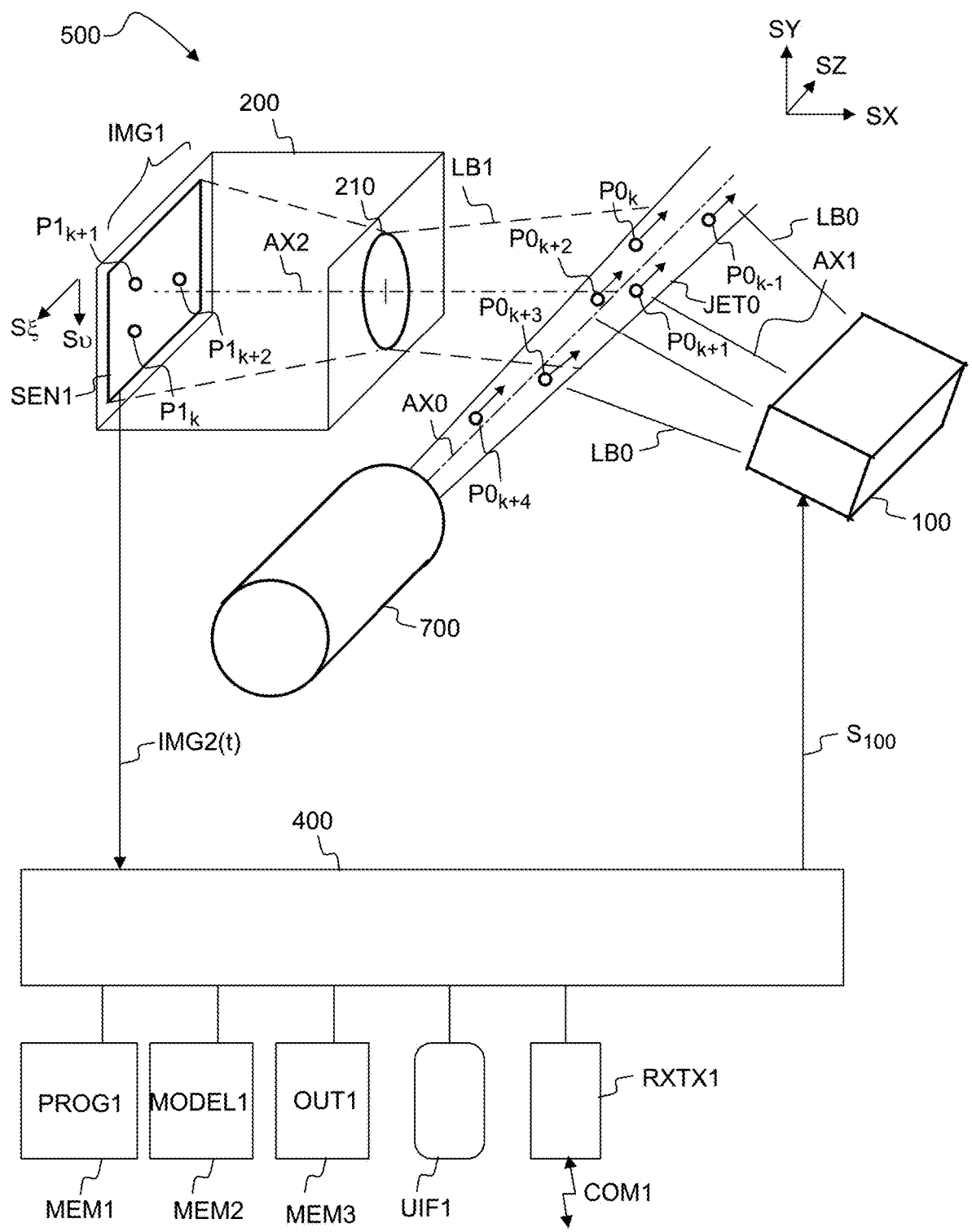
FIG. 3b shows, by way of example, in a three dimensional view, an optical measuring device arranged to capture images of particles of the particle jet.

Referring to FIG. 3b, the angle between the axis AX1 and the axis AX2 may also substantially deviate from 90°, e.g. in order to provide high optical scattering coefficient when the particles P0 provide the light LB1 towards the optics 210 of the imaging unit 200 from the illuminating light LB0.

Figure 4A:
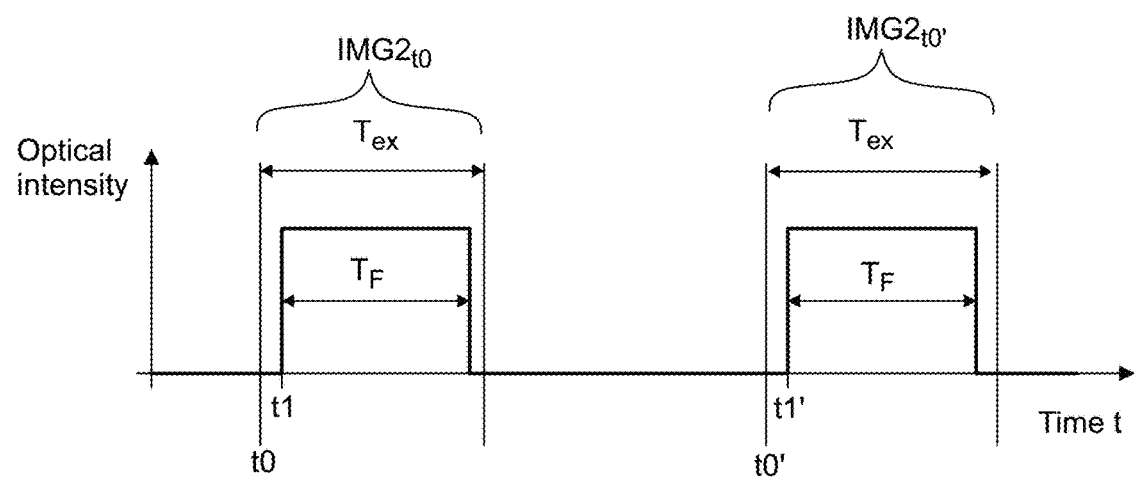
FIG. 4a shows, by way of example, timing of illuminating light pulses.

FIG. 4a shows, by way of example, temporal evolution of optical intensity of illuminating light LB0 in the measurement region RG0. The particles P0 may be illuminated by a single light pulse LB0 during an exposure time period $T_{ex}$. A first exposure time for capturing a first image $IMG2_{t0}$ may start at a time t0. A first illuminating light pulse LB0 may start at a time t1. $T_F$ may denote the duration of the illuminating light pulses LB0. A second exposure time for capturing a second image $IMG2_{t0'}$ may start at a time t0'. A second illuminating light pulse LB0 may start at a time t1'.

Figure 4B:
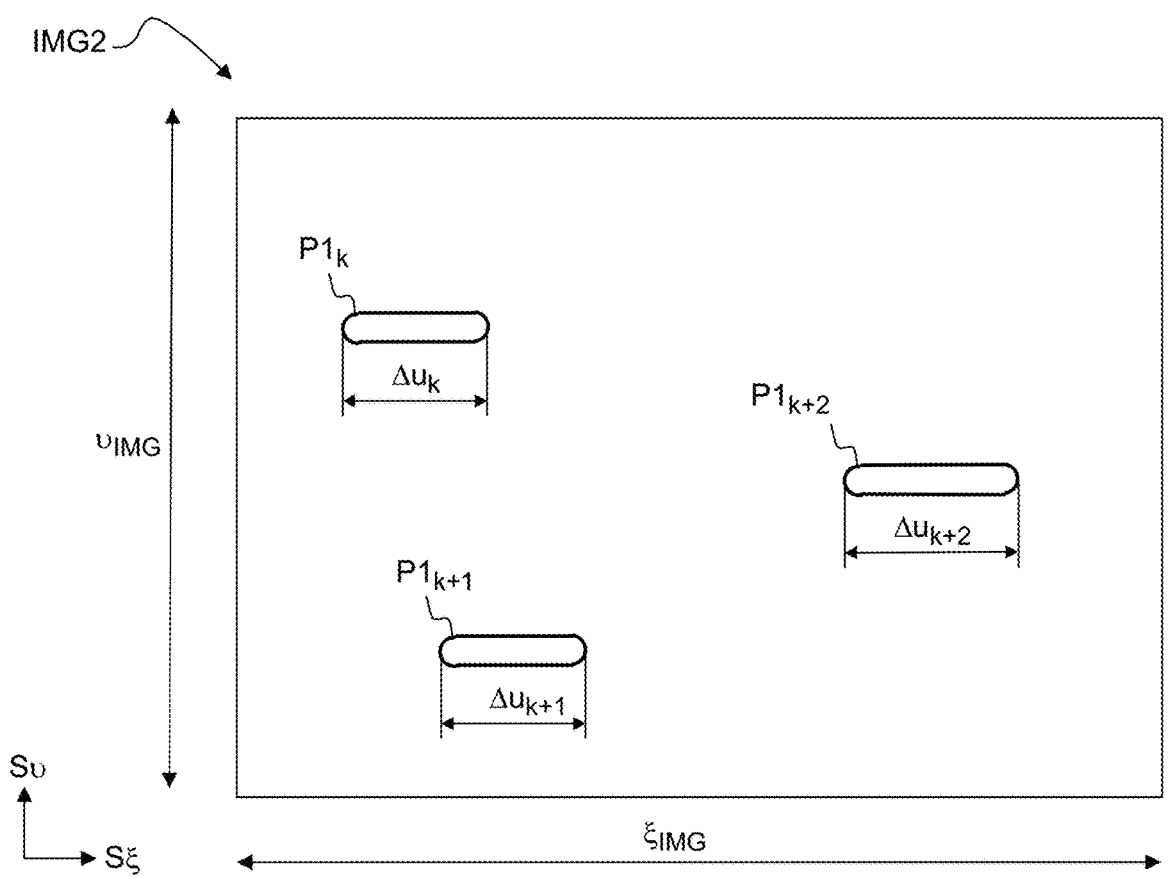
FIG. 4b shows, by way of example, an image captured by an image sensor of the measuring device.

Referring to FIG. 4b, the digital image IMG2 may comprise e.g. sub-images $P1_k$, $P1_{k+1}$, $P1_{k+2}$. The sub-image $P1_k$ may be an image of a particle $P0_k$. The sub-image $P1_{k+1}$ may be an image of a particle $P0_{k+1}$. The sub-image $P1_{k+2}$ may be an image of a particle $P0_{k+2}$. The length $\Delta u$ of each sub-image P1 may be substantially proportional to the velocity of the corresponding particle P0. The sub-image $P1_k$ may have a dimension $\Delta u_k$ in the direction $S\xi$. The sub-image $P1_{k+1}$ may have a dimension $\Delta u_{k+1}$. The sub-image $P1_{k+2}$ may have a dimension $\Delta u_{k+2}$. The velocity of each individual particle P1 may be calculated from the dimension $\Delta u$ of the corresponding sub-image P1, and from the timing or duration $T_F$ of the illuminating light pulses LB0. For example, the velocity $v_k$ of the particle $P0_k$ may be substantially proportional to the value $\Delta u_k/T_F$.

The sub-images $P1_k$, $P1_{k+1}$, $P1_{k+2}$ may be detected e.g. by an image analysis algorithm. The device 500 may be configured to detect the sub-images $P1_k$, $P1_{k+1}$, $P1_{k+2}$ by using an image analysis algorithm. The device 500 may be configured to determine the dimensions $\Delta u_k$, $\Delta u_{k+1}$, $\Delta u_{k+2}$ from one or more captured images IMG2 by using an image analysis algorithm.

The digital image IMG2 may have a width $\xi IMG$ and a height $\upsilon_{IMG}$ in the image space defined by directions $S\xi$ and $S\upsilon$. The image of the axis AX0 may be parallel with the direction $S\xi$. The direction $S\upsilon$ may be perpendicular to the direction $S\xi$.

The width $\xi_{IMG}$ may be e.g. equal to 1024 pixels, and the height $\upsilon_{IMG}$ may be e.g. equal to 512 pixels.

The velocity of the particles may also be measured by using continuous illuminating light, i.e. light, which is not pulsed. In that case the velocity $v_k$ of the particle $P0_k$ may be substantially proportional to the value $\Delta u_k/T_{ex}$.

The use of pulsed illumination may allow high instantaneous intensity and/or may allow precise timing for forming the sub-images.

Figure 4C:
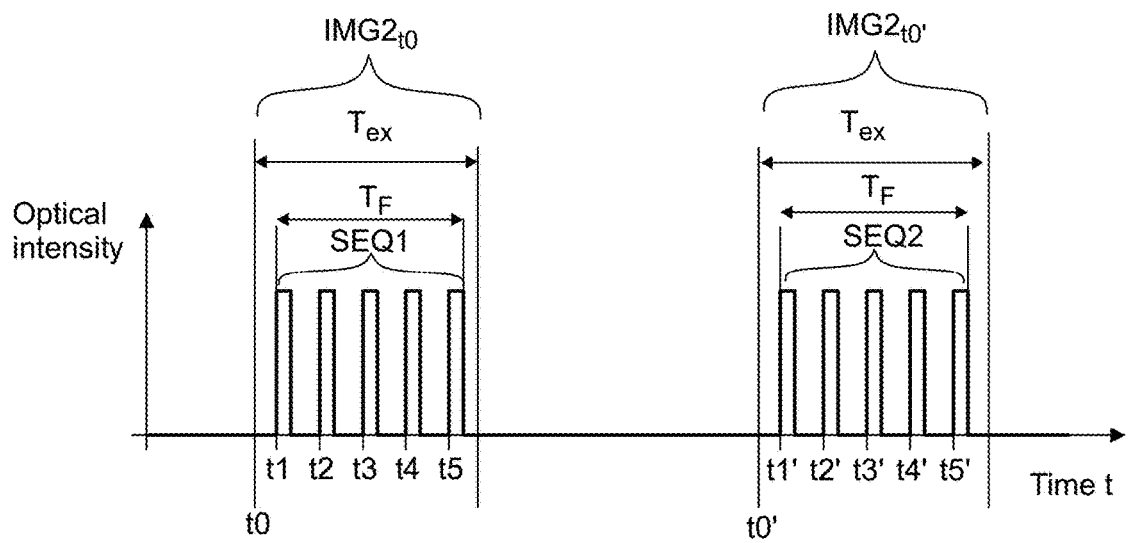
FIG. 4c shows, by way of example, timing of illuminating light pulses.
Figure 4D:
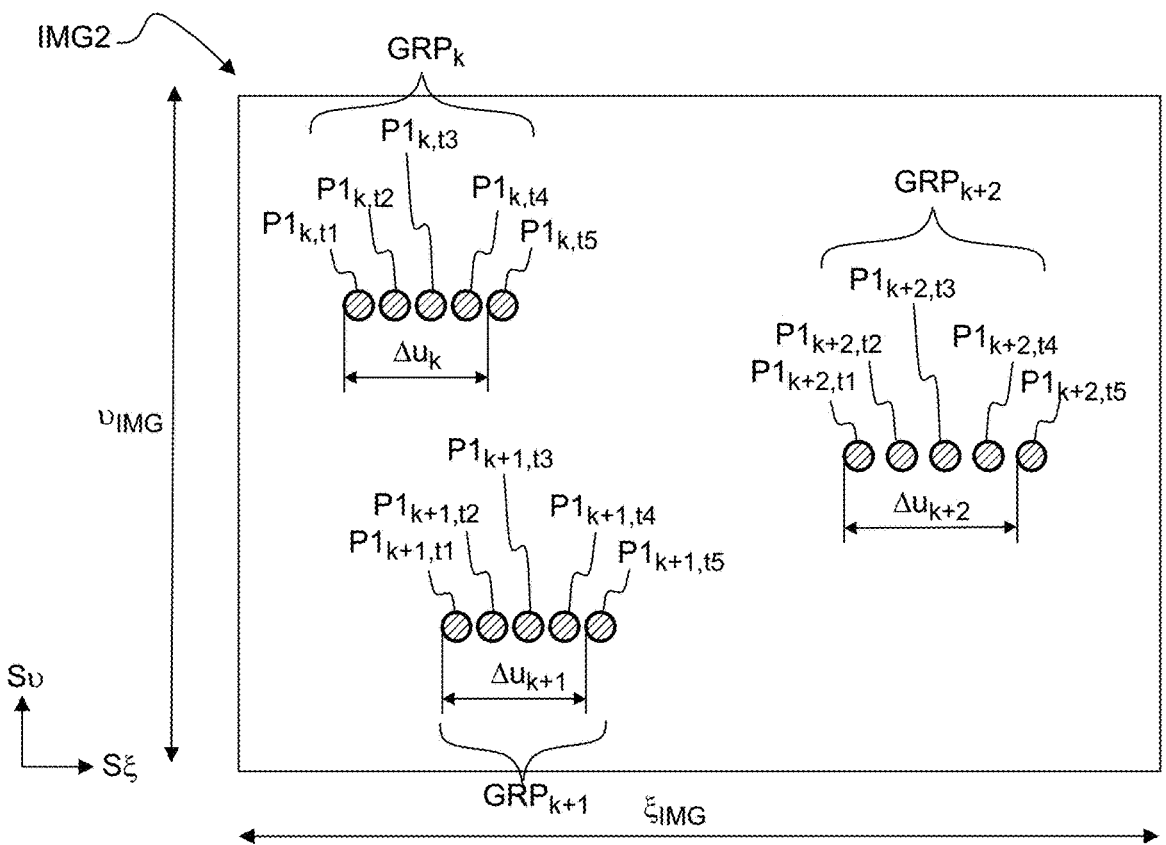
FIG. 4d shows, by way of example, an image captured by the image sensor of the measuring device.

Referring to FIGS. 4c and 4d, the illuminating unit 100 may be arranged to provide pulse sequences SEQ1, SEQ2, e.g. in order to facilitate detection of the sub-images P1 by an image analysis algorithm. A pulse sequence SEQ1 may comprise e.g. two or more pulses. A first pulse sequence may comprise e.g. pulses starting at times t1, t2, t3, t4, t5. A second pulse SEQ2 sequence may comprise e.g. pulses starting at times t1', t2', t3', t4', t5'.

The exposure time $T_{ex}$ may temporally overlap several light pulses so that each particle P0 may be represented by a group GRP, which is formed of two or more sub-images P1 appearing in the digital image IMG2. For example, the particle $P0_k$ may be represented by a first group $GRP_k$ formed of sub-images $P1_{k,t1}$, $P1_{k,t2}$, $P1_{k,t3}$, $P1_{k,t4}$, $P1_{k,t5}$. The distance between adjacent sub-images $P1_{k,t1}$, $P1_{k,t2}$ may depend on the velocity $v_k$ of the particle $P0_k$ and on the timing of the light pulses. Consequently, the velocity of each particle appearing in the image IMG2 may be determined by analyzing the image IMG2. The sub-images $P1_{k,t1}$, $P1_{k,t2}$, $P1_{k,t3}$, $P1_{k,t4}$, $P1_{k,t5}$ may together form a combined shape, which may facilitate reliable detection of the sub-images $P1_{k,t1}$, $P1_{k,t2}$, $P1_{k,t3}$, $P1_{k,t4}$, $P1_{k,t5}$, when analyzing the captured image IMG2. A second particle $P0_{k+1}$ may be represented by a second group $GRP_{k+1}$ formed of sub-images $P1_{k+1,t1}$, $P1_{k+1,t2}$, $P1_{k+1,t3}$, $P1_{k+1,t4}$, $P1_{k+1,t5}$.

Figure 4E:
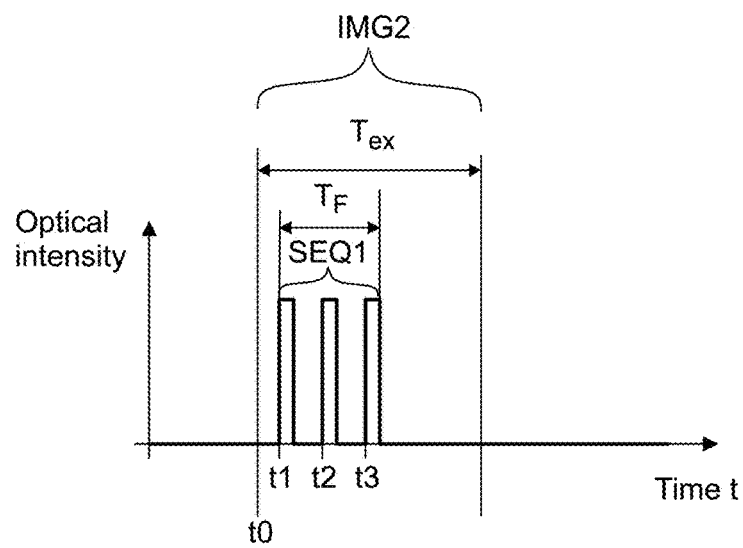
FIG. 4e shows, by way of example, timing of illuminating light pulses.

Referring to FIG. 4e, the particle jet JET0 may be illuminated by an illuminating pulse sequence SEQ1. The pulse sequence may comprise e.g. three or more illuminating light pulses, which may be emitted at times t1, t2, t3, . . . .

Figure 4F:
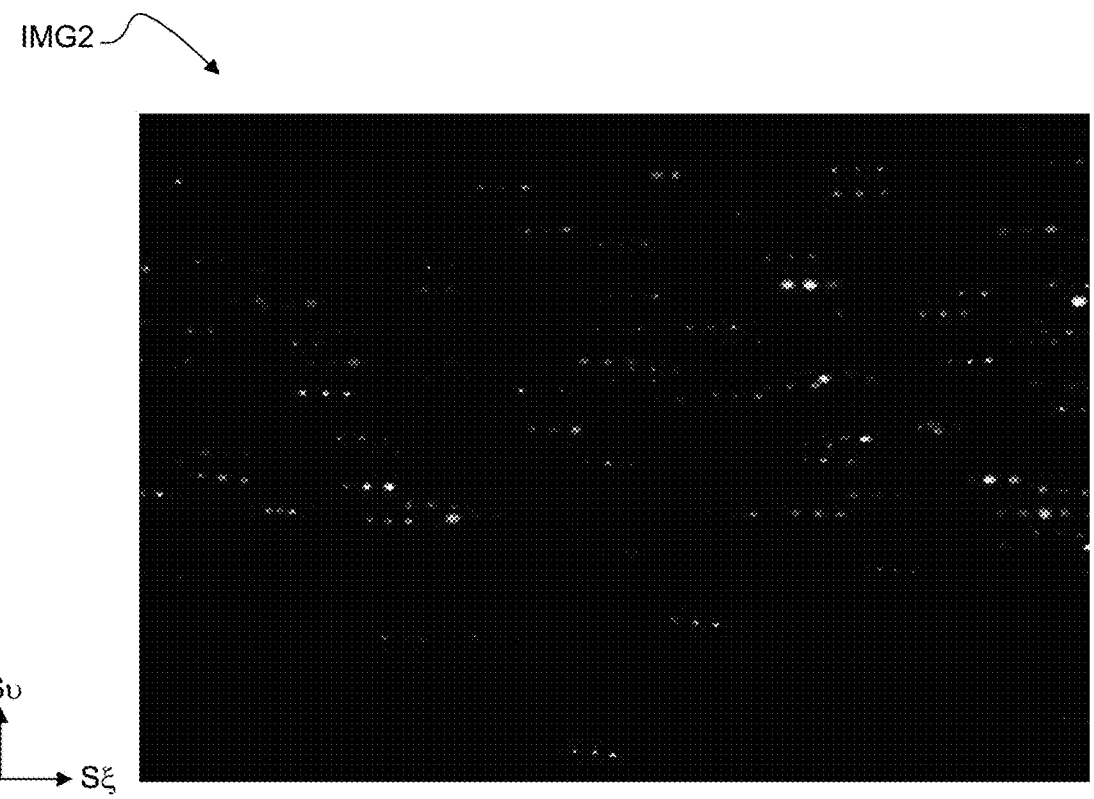
FIG. 4f shows, by way of example, an image captured by the image sensor of the measuring device.
Figure 4G:
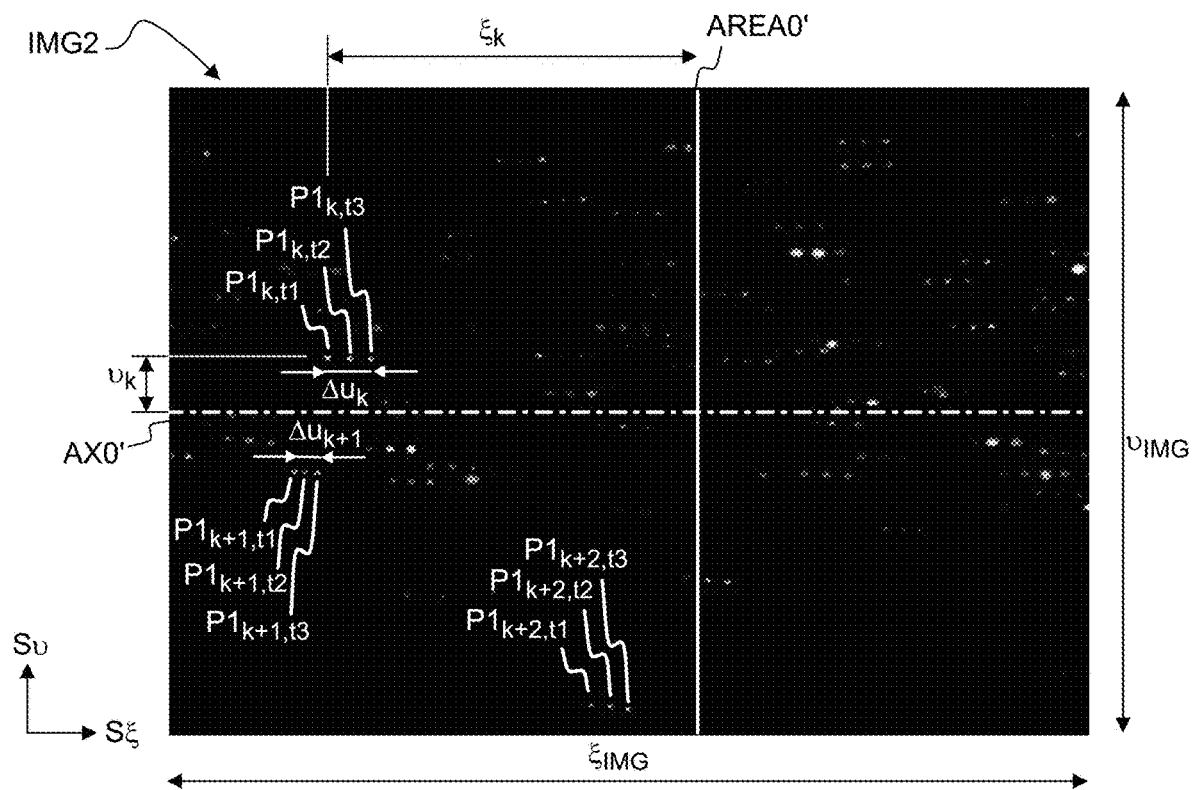
FIG. 4g shows, by way of example, sub-images obtained by using an illuminating pulse sequence.

FIGS. 4f and 4g show, by way of example, a (digital) image IMG2, which was captured by using the illuminating pulse sequence. FIGS. 4g and 4f show the same captured image IMG2. When using three or more illuminating pulses, the captured image IMG2 may comprise easily discernible substantially linear groups GRP of sub-images (e.g. $P1_{k,t1}$, $P1_{k,t2}$, $P1_{k,t3}$), wherein each group GRP may represent a single moving particle (e.g. $P0_k$) which was illuminated by the pulse sequence during the exposure time period $T_{ex}$ of the captured image IMG2. The position of the first sub-image $P1_{k,t1}$ of the first group $GRP_k$ may be specified e.g. by image coordinates $(\xi_k, \upsilon_k)$. The position $(\xi_k, \upsilon_k)$ may indicate the position of the particle $P0_k$ when the image IMG2 was captured.

The velocity of the particles may be determined by analyzing the captured images. For example, the velocity of a first particle $P0_k$ may be determined from the dimension $\Delta u_k$ of a first group $GRP_k$ formed of the sub-images $P1_{k,t1}$, $P1_{k,t2}$, $P1_{k,t3}$. For example, the velocity of a second particle $P0_{k+1}$ may be determined from the dimension $\Delta u_{k+1}$ of a second group $GRP_{k+1}$ formed of the sub-images $P1_{k+1,t1}$, $P1_{k+1,t2}$, $P1_{k+1,t3}$.

The method may comprise counting the number of particles appearing in a single captured image. The method may comprise counting the number of particles appearing in the captured images. The particle density may be determined from the counted number of particles. Thus, the particle density may be determined by analyzing the captured images.

The imaging unit 200 may have a certain depth of field (DoF) such that particles which are within the depth of field may have sharp sub-images on the image sensor SEN1, and particles which are outside the depth of field may have blurred sub-images on the image sensor SEN1. The captured image may comprise blurred sub-images e.g. if the thickness of the illuminating light beam LB0 is greater than the depth of field (DoF). On the other hand, sharper images may be provided when the thickness of the illuminating light beam LB0 is smaller than or equal to the depth of field (DoF).

The groups (e.g. $GRP_k$) formed of the sub-images (e.g. $P1_{k,t1}$, $P1_{k,t2}$, $P1_{k,t3}$) may be detected by using a pattern recognition algorithm. Each particle P0 may be assumed to have a substantially constant velocity during the exposure time $T_{ex}$.

A candidate group representing a particle may be accepted if the sub-images of said group are aligned in a substantially linear manner and if the distance between adjacent sub-images of said candidate group match with the timing (t1,t2,t3) of the illuminating light pulses LB0.

A candidate group may be e.g. discarded if the sub-images of said group are not aligned in a linear manner and/or if the distance between adjacent sub-images of said candidate group do not match with the timing (t1,t2,t3) of the illuminating light pulses LB0.

AX0' may indicate the position of the axis AX0 of the jet JET0. AREA0' may indicate the position of the reference area AREA0. The position of the projection of the reference area AREA0 may be indicated by a line AREA0', which may be superposed on the captured image IMG2. The position of the projection of the axis AX0 may be indicated by a line AX0', which may be superposed on the captured image IMG2.

Figure 4H:
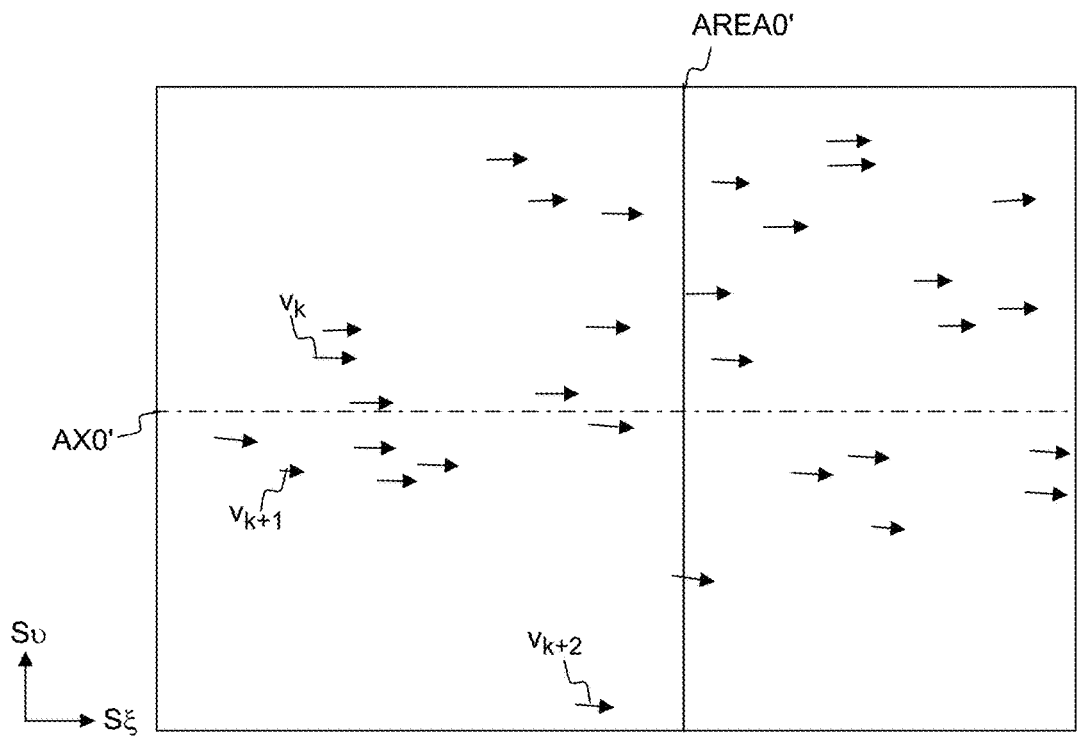
FIG. 4h shows, by way of example, particle velocity vectors determined by analyzing the captured image of FIG. 4f.

FIG. 4h shows, by way of example, a plurality of arrow symbols, which indicate velocity vectors of particles. The velocity vectors may be determined by analyzing the captured image of FIG. 4g. The method may comprise determining the direction movement of a particle by analyzing one or more captured images. The length of each arrow symbol may be proportional to the speed of a particle, and the direction of the arrow symbol may indicate the direction of movement of the particle.

FIG. 5a shows, by way of example, velocity distributions measured by analyzing the captured images. The upper histogram of FIG. 5a shows a first velocity distribution measured when the shot peening unit 700 operated according to a first operating parameter value (e.g. $p_{acc}$=500 kPa). The lower histogram of FIG. 5a shows a second velocity distribution measured when the shot peening unit 700 operated according to a second operating parameter value (e.g. $p_{acc}$=350 kPa). A change of the pressure $p_{acc}$ of the accelerating gas may have an effect on the average velocity of the particles. A change of the pressure $p_{acc}$ of the accelerating gas may cause a change of the peak velocity $v_{PEAK}$ of the velocity distribution.

$N_p$/bin may indicate the number $N_p$ of particles whose velocity is within a velocity range associated with a bin BIN1, BIN2, BIN3, . . . . For example the height of the vertical bar marked with the symbol BIN2 may represent the number $N_p$ of particles P0 whose velocity was within the range defined by the velocities $v_{BIN1}$ and $v_{BIN2}$ during a measurement time period $T_{MEAS}$. For example the height of the vertical bar marked with the symbol BIN3 may represent the number $N_p$ of particles P0 whose velocity was within the range defined by the velocities $v_{BIN2}$ and $v_{BIN3}$ during a measurement time period $T_{MEAS}$. The predetermined velocity ranges (e.g. from $v_{BIN2}$ to $v_{BIN3}$) may be called e.g. as the velocity bins.

The number $N_p$ associated with a bin may be indicative of a probability that a (randomly selected) particle of the jet has a velocity, which is within said bin. The velocity distributions of FIG. 5a may also be called as velocity probability distributions.

Referring to FIG. 5b, the upper histogram may represent a measured velocity distribution, and the lower histogram may represent a measured energy distribution. The energy distribution may be determined from the measured velocity distribution.

The method may comprise:
determining a velocity distribution by analyzing the captured images, and
determining an energy distribution from the velocity distribution.

$N_p$/bin may indicate the number $N_p$ of particles whose kinetic energy is within an energy range associated with a bin BIN21, BIN22, BIN23, . . . . For example the height of the vertical bar marked with the symbol BIN22 may represent the number $N_p$ of particles P0 whose kinetic energy was within the range defined by the energy values $E_{BIN21}$ and $E_{BIN22}$ during the measurement time period $T_{MEAS}$. The height of the vertical bar marked with the symbol BIN23 may represent the number $N_p$ of particles P0 whose kinetic energy was within the range defined by the values $E_{BIN22}$ and $E_{BIN23}$ during said measurement time period $T_{MEAS}$. For example, the energy bin BIN23 may represent energy values, which are within the range from 24 mJ to 35 mJ, and the number $N_p$ of particles having the kinetic energy within said range may be approximately equal to 490 during the measurement time period $T_{MEAS}$.

The method may comprise fitting a regression function to the measured data. FIG. 5c shows, by way of example, a probability density function $p_v(v)$ obtained by fitting a regression function to the histogram data of FIG. 5a. The probability density function $p_v(v)$ may be optionally normalized such that the integral of the probability density function $p_v(v)$ over all possible velocities is equal to one. The probability density function $p_v(v)$ may represent a measured velocity distribution of the particles of the jet JET0. The probability density function $p_v(v)$ may have a peak value $p_{MAX}$ associated with a velocity $v_{PEAK}$. The velocity $v_{PEAK}$ may denote the most probable velocity of the particles P0. The velocity distribution $p_v(v)$ may have a width $\Delta v_{FWHM}$, which may be defined by a first velocity $v_L$ and a second velocity $v_H$. The velocities $v_L$, $v_H$ may be selected such that the velocity distribution $p_v(v)$ is equal to 50% of the maximum value $p_{MAX}$ at the velocities $v_L$ and $v_H$.

The velocity distribution $p_v(v)$ may also sometimes have two or more peaks.

FIG. 5d shows, by way of example, a probability density function $p_E(E)$ obtained by fitting a regression function to the energy distribution shown in FIG. 5b. The probability density function $p_E(E)$ may be optionally normalized such that the integral of the probability density function $p_E(E)$ over all possible energy values is equal to one. The probability density function $p_E(E)$ may represent a measured energy distribution of the particles of the jet JET0.

Referring to FIG. 5e, the captured images may also be partitioned into two or more regions, which may be analyzed separately so as to provide spatial distributions. The uppermost curve of FIG. 5e may represent a spatial distribution n(y) of particle density. $y_0$ may denote the (vertical) position of the axis AX0 of the jet JET0. $y_1$ may denote the (vertical) position of an arbitrary point of the jet JET1. The second curve from the top may represent a spatial distribution $v_{AVG}(y)$ of average velocity $v_{AVG}$ of the particles. The third curve from the top may represent spatial distribution $v_{RMS}$ (y) of RMS velocity $v_{RMS}$ of the particles P0 of the jet JET0. The lowermost curve may represent the spatial distribution $\Phi(y)$ of kinetic energy flux of the particles P0 of the jet JET0. The energy flux $\Phi$ may mean the total kinetic energy of particles passing through unit area per unit time.

The spatial distributions of FIG. 5e may be determined by analyzing the captured images. The spatial distributions of FIG. 5e may be determined by determining the velocities of the particles from the captured images.

Figure 6A:
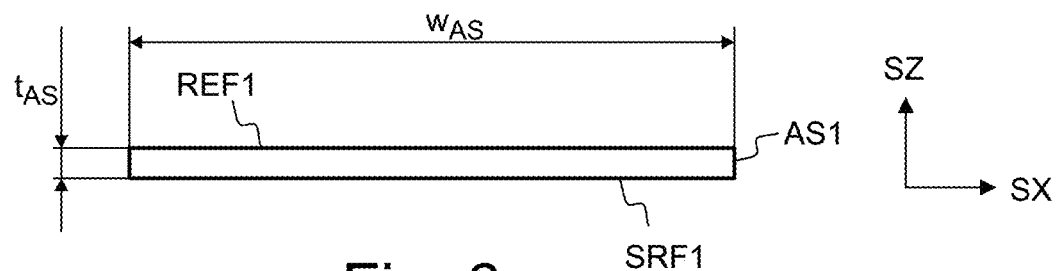
FIG. 6a shows, by way of example, in a side view, a test strip which is in the initial straight state.
Figure 6B:
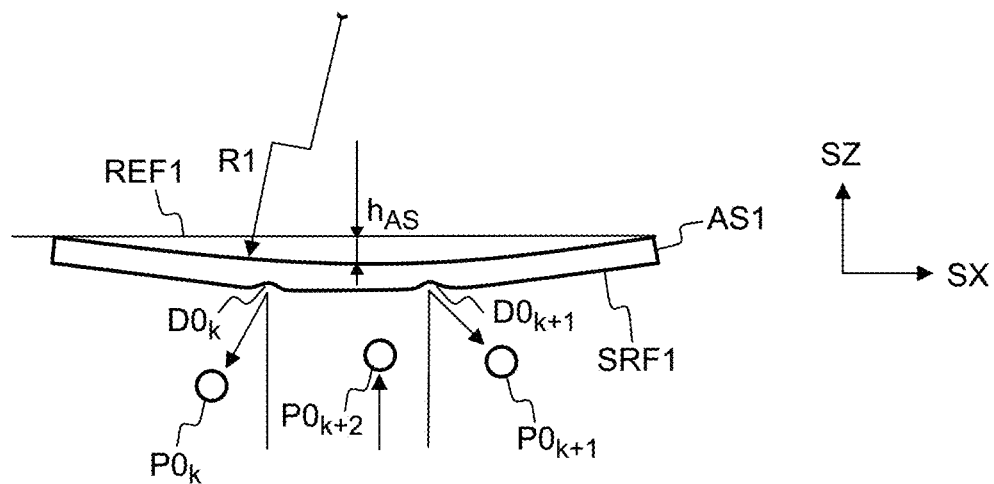
FIG. 6b shows, by way of example, in a side view, geometric deformation of the test strip when the test strip is exposed to the particles of the particle jet.

FIGS. 6a and 6b show a test strip AS1 before exposure and during exposure to the particle jet JET0. The strip AS1 may initially be substantially flat and straight. The test strip AS1 may have a width $w_{AS}$ and a thickness $t_{AS}$. REF1 denotes the initial position of the surface SRF1 of the test strip AS1.

The particles P0 hitting the surface SRF1 may slightly deform the surface SRF1. The particles P0 may irreversibly deform the surface SRF1. For example, a particle $P0_k$ may cause a first microscopic dent $D0_k$ in the surface SRF1 of the test strip AS1. For example, a particle $P0_{k+1}$ may cause a second microscopic dent $D0_{k+1}$ in the surface SRF1 of the test strip AS1. The particles may cause residual compressive stress in the surface layer of the test strip AS1 such that the test strip is bent. The surface of the strip may have a plurality of dents after it has been exposed to the particle jet. The strip may be curved after it has been exposed to the particle jet. The shape of the test strip AS1 may be defined e.g. by an arc height value $h_{AS}$ and/or by a radius of curvature $R_1$. The arc height value $h_{AS}$ may be measured according to a standardized method e.g. by using a measuring instrument called as the Almen gage.

The operating parameters of a (first) shot peening unit 700 may comprise e.g.:
  average size of the particles,
  average mass of the particles,
  mass flow rate of the particles,
  mass flow rate of accelerating gas,
  orientation of the axis AX0 of the jet with respect to gravity.

A set of operating parameters of the shot peening unit 700 may refer e.g. to the following group of parameters:
  average size of the particles,
  average mass of the particles,
  mass flow rate of the particles,
  mass flow rate of accelerating gas,
  orientation of the axis AX0 of the jet with respect to gravity.

A relationship between operating parameter values and corresponding arc height values $h_{AS}$ may be described by a model MODEL1. The method may comprise determining one or more parameter values of the model MODEL1.

Figure 6C:
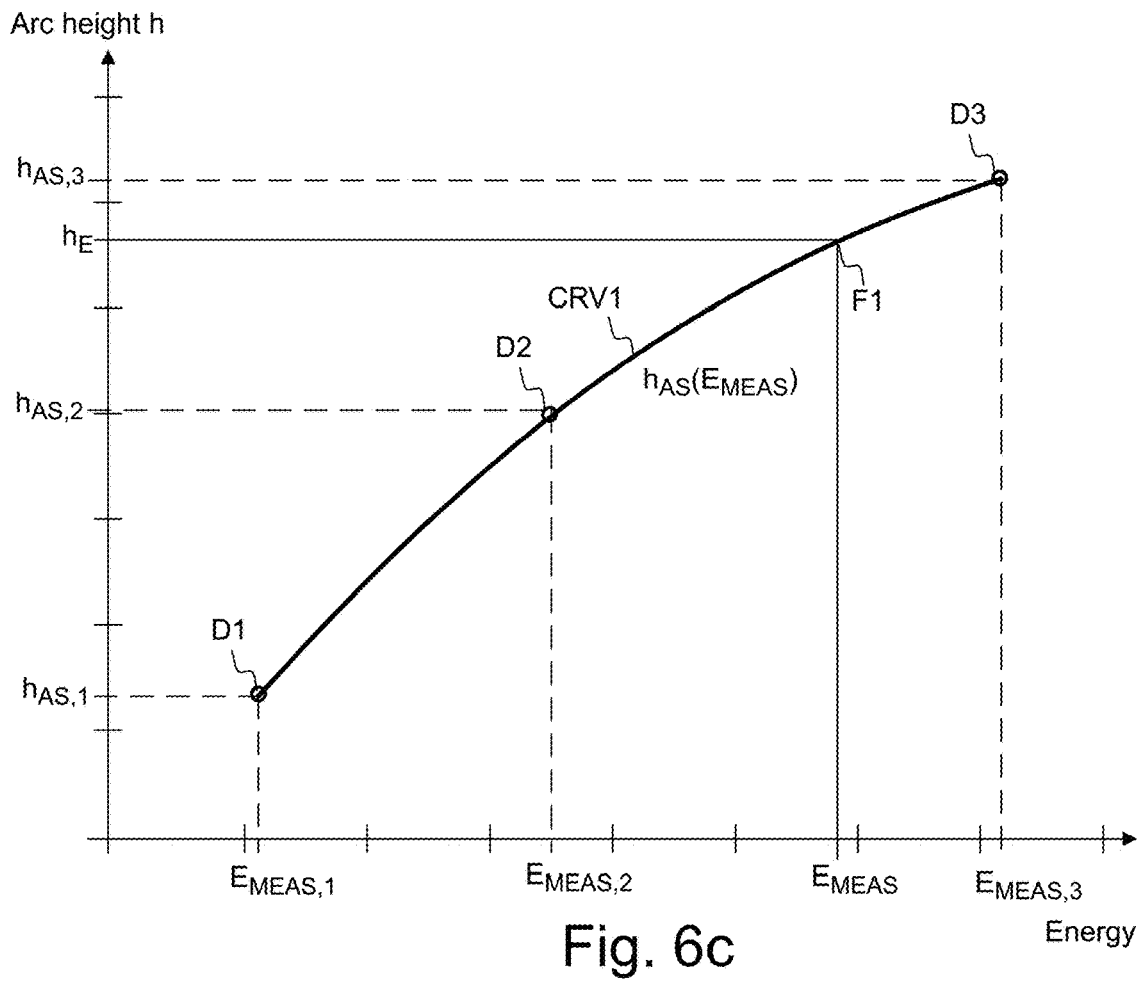
FIG. 6c shows, by way of example, a regression curve fitted to experimental data.

A change of a parameter value may have an effect on the total kinetic energy of particles passing through the reference area per unit time. Thus, said change of a parameter value may have an effect on the capability of the particle jet to cause deformation of a surface. The model MODEL1 may be determined experimentally. The effect of an operating parameter on the total energy may be determined experimentally by varying the operating parameter and by using the measuring instrument 500 for measuring corresponding total energy values $E_{MEAS}$. The effect of said operating parameter on the arc height value may be determined experimentally by varying the operating parameter and by exposing a test strip AS1 to the particle jet. A data point (e.g. D1 in FIG. 6c) may comprise an energy value $E_{MEAS}$ and an arc height value $h_{AS}$ such that the energy value $E_{MEAS}$ and the arc height value $h_{AS}$ are obtained by using the same set of operating parameters.

The device 500 may be configured to receive one or more measured arc height values $h_{AS}$ e.g. via the user interface UIF1 and/or via the communication unit RXTX1. For example, a user may input one or more measured arc height values $h_{AS}$ via the user interface UIF1. For example, the communication unit RXTX1 may receive one or more measured arc height values $h_{AS}$ from an Almen gage and/or from another measuring instrument. The communication unit RXTX1 may also be called as a communication interface.

The apparatus 500 may comprise:
  an illuminating unit 100 to provide an illuminating beam LB0,
  an image sensor SEN1 to capture images IMG2 of a particle jet JET1 illuminated by the illuminating beam LB0, and
  an interface UIF1, RXTX1 to receive one or more deformation values $h_{AS}$,
wherein the apparatus 500 may be configured to determine one or more velocity values (e.g. $v_{AVE}$, $v_{RMS}$) of particles P0 of the particle jet JET1 by analyzing the captured images IMG2, and to determine a model MODEL1 based on the one or more first deformation values $h_{AS}$ and based on the one or more velocity values ($v_{AVE}$, $v_{RMS}$).

The method may comprise obtaining one or more data points D1, D2 such that a first data point D1 is obtained by using a first set of operating parameters. The model MODEL1 may be determined by e.g. fitting a function based on the data point D1.

The method may comprise obtaining two or more data points D1, D2 such that a first data point D1 is obtained by using a first set of operating parameters, and a second data point D2 is obtained by using a second different set of operating parameters. The model MODEL1 may be determined by e.g. fitting a function to the obtained data points D1, D2.

A change of an operating parameter of the shot peening unit 700 may have an effect on the total energy value $E_{MEAS}$, which in turn may have an effect on the corresponding arc height value $h_{AS}$. Thus, the model MODEL1 may also describe the relationship between total energy values $E_{MEAS}$ and the corresponding arc height values $h_{AS}$. The model MODEL1 may be used for estimating an arc height value $h_{AS}=h_{AS}(E_{MEAS})$, which is likely to correspond to a measured energy value $E_{MEAS}$.

Determining the model MODEL1 may comprise determining a first data point (D1), which comprises a first measured total energy value $E_{MEAS,1}$, and a first measured arc height value $h_{AS,1}$. The first height value $h_{AS,1}$ may be measured by exposing a test strip AS1 to the particle jet during a first measurement time period $T_{MEAS,1A}$. The first measured total energy value $E_{MEAS,1}$ may be determined from one or more velocity values obtained by analyzing images IMG2 captured during a second measurement time period $T_{MEAS,1B}$. The second measurement time period $T_{MEAS,1B}$ may also be called e.g. as a first auxiliary time period. The particle jet may be provided by a first shot peening unit 700 during the measurement time periods $T_{MEAS,1A}$, $T_{MEAS,1B}$ by using a first set of operating parameters. The distance L1 between the first shot peening unit 700 and the test strip AS1 may be substantially equal to the distance L0 between the first shot peening unit 700 and the reference area AREA0 during the measurement time periods $T_{MEAS,1A}$, $T_{MEAS,1B}$. In other words, the measuring device 500 may be arranged to operate such that the measured energy value $E_{MEAS,1}$ substantially corresponds to the integrated energy of the particle flux passing through a reference area AREA0, wherein the distance between the first shot peening unit 700 and the reference area AREA0 is substantially equal to the distance L1.

A second data point D2 may comprise a second measured total energy value $E_{MEAS,2}$, and a second measured arc height value $h_{AS,2}$. The second height value $h_{AS,2}$ may be measured by exposing a second test strip AS1 to the particle jet during a second measurement time period $T_{MEAS,2A}$. The second measured total energy value $E_{MEAS,2}$ may be determined by analyzing images IMG2 captured during a second auxiliary time period $T_{MEAS,2B}$. The particle jet may be provided by the first shot peening unit 700 during the measurement time periods $T_{MEAS,2A}$, $T_{MEAS,2B}$ by using a second set of operating parameters. The distance L1 between the first shot peening unit 700 and the test strip AS1 may be substantially equal to the distance L0 between the first shot peening unit 700 and the reference area AREA0 during the measurement time periods $T_{MEAS,1A}$, $T_{MEAS,1B}$, $T_{MEAS,2A}$, $T_{MEAS,2B}$.

A third data point D3 may comprise a third measured total energy value $E_{MEAS,3}$, and a third measured arc height value $h_{AS,3}$. The third height value $h_{AS,3}$ may be measured by exposing a third test strip AS1 to the particle jet during a third measurement time period $T_{MEAS,3A}$. The third measured total energy value $E_{MEAS,3}$ may be determined by analyzing images IMG2 captured during a third auxiliary time period $T_{MEAS,3B}$. The particle jet may be provided by the first shot peening unit 700 during the measurement time periods $T_{MEAS,3A}$, $T_{MEAS,3B}$ by using a third set of operating parameters. The distance L1 between the first shot peening unit 700 and the test strip AS1 may be substantially equal to the distance L0 between the first shot peening unit 700 and the reference area AREA0 during the measurement time periods $T_{MEAS,1A}$, $T_{MEAS,1B}$, $T_{MEAS,2A}$, $T_{MEAS,2B}$, $T_{MEAS,3A}$, $T_{MEAS,3B}$.

An estimate (e.g. $h_E$) for an arc height value may be subsequently determined from a measured energy value $E_{MEAS}$ by using the model $h_{AS}(E_{MEAS})$. The measured energy value $E_{MEAS}$ may correspond e.g. to a point F1 of the regression curve CRV1.

Table 1 shows, by way of example, measured values associated with the measurement time periods $T_{MEAS,1A}$, $T_{MEAS,1B}$, $T_{MEAS,2A}$, $T_{MEAS,2B}$, $T_{MEAS,3A}$, $T_{MEAS,3B}$. The measurement time periods listed in Table 1 have the same length.

TABLE 1

Examples of measured values associated with measurement time periods $T_{MEAS,1A}$, $T_{MEAS,1B}$, $T_{MEAS,2A}$, $T_{MEAS,2B}$, $T_{MEAS,3A}$, $T_{MEAS,3B}$.

| Period | $P_{acc}$ (kPa) | $h_{AS}$ (mm) | Period | $P_{acc}$ (kPa) | $N_{MEAS}$ | $V_{AVE}$ (m/s) | $E_{MEAS}$ (J) |
|---|---|---|---|---|---|---|---|
| $T_{MEAS,1A}$ | 200 | 1.3 | $T_{MEAS,1B}$ | 200 | 3789 | 16.6 | 22.0 |
| $T_{MEAS,2A}$ | 350 | 4.0 | $T_{MEAS,2B}$ | 350 | 2207 | 30.2 | 70.9 |
| $T_{MEAS,3A}$ | 500 | 6.2 | $T_{MEAS,3B}$ | 500 | 1618 | 42.4 | 144 |

$p_{acc}$ denotes a pressure of accelerating gas of the shot peening unit 700. kPa means kiloPascal. The pressure $p_{acc}$ may have an effect of the initial velocity of the particles. The velocity of the accelerating gas may depend on the pressure $p_{acc}$. The mass flow rate of the accelerating gas may depend on the pressure $p_{acc}$.

$h_{AS}$ denotes the arc height value of the Almen strip AS1 after the strip AS1 has been exposed to the particle jet during the measurement time period $T_{MEAS,1A}$, $T_{MEAS,2A}$, or $T_{MEAS,3A}$.

$N_{MEAS}$ denotes the number of particles which pass through the reference area AREA0 during the measurement time period $T_{MEAS,1B}$, $T_{MEAS,2B}$, or $T_{MEAS,3B}$. The number $N_{MEAS}$ may be determined by analyzing the images captured by the measuring device 500 during the measurement time period $T_{MEAS,1B}$, $T_{MEAS,2B}$, or $T_{MEAS,3B}$.

$v_{AVE}$ denotes the average velocity of particles which pass through the reference area AREA0 during the measurement time period $T_{MEAS,1B}$, $T_{MEAS,2B}$, or $T_{MEAS,3B}$. The average velocity $v_{AVE}$ may be determined by analyzing the images captured by the measuring device 500 during the measurement time period $T_{MEAS,1B}$, $T_{MEAS,2B}$, or $T_{MEAS,3B}$.

$E_{MEAS}$ denotes the total kinetic energy of particles which pass through the reference area AREA0 during the measurement time period $T_{MEAS,1B}$, $T_{MEAS,2B}$, or $T_{MEAS,3B}$. The energy values $E_{MEAS}$ may be determined by analyzing the images captured by the measuring device 500 during the measurement time period $T_{MEAS,1B}$, $T_{MEAS,2B}$, or $T_{MEAS,3B}$.

The model MODEL1 may be determined from the one or more experimentally measured data points D1, D2, D3. The model MODEL1 may be determined by fitting a function to the one or more determined data points D1, D2, D3. The model MODEL1 may be a regression function $h_{AS}(E_{MEAS})$, which may be fitted to the data points D1, D2, D3. The model MODEL1 may be e.g. a polynomial function, which is fitted to the data points D1, D2, D3. The function $h_{AS}(E_{MEAS})$ may be represented e.g. by a curve CRV1 shown in FIG. 6c. The model MODEL1 may determine a relationship operating parameter values and the corresponding arc height values $h_{AS}$.

The model MODEL1 may be used for estimating an arc height value $h_{AS,E}$ from a measured energy value $E_{MEAS}$. The method may comprise:

determining a model MODEL1,
capturing images of particles passing through the measurement region RG0 during a measurement time period $T_{MEAS}$,
determining a measured energy value $E_{MEAS}$ by analyzing the captured images, and
determining a corresponding arc height value $h_{AS}$ from the measured energy value $E_{MEAS}$ by using the model MODEL1.

$N_{MEAS}$ may denote the number of particles hitting the test strip AS1 during a measurement time period $T_{MEAS}$. $N_{MEAS}$ may also denote the number of particles passing through the reference area AREA0 during a measurement time period $T_{MEAS}$. The length of the measurement time period $T_{MEAS}$ may be e.g. in the range of 1 s to 1000 s. $E_k$ may denote the kinetic energy of an individual particle $P0_k$. $m_k$ may denote the mass of the individual particle $P0_k$. The kinetic energy $E_k$ of an individual particle $P0_k$ may be calculated from the velocity $v_k$ of said particle $P0_k$ by using the equation:

$$E_k = \frac{1}{2} m_k v_k^2 \qquad (1)$$

The total kinetic energy $E_{MEAS}$ of particles $P0_k$, $P0_{k+1}$, $P0_{k+2}$, ... passing through the reference area AREA0 during the measurement time period $T_{MEAS}$ may be calculated by using the following equation:

$$E_{MEAS} = \sum_{k=1}^{N_{MEAS}} \frac{1}{2} m_k v_k^2 \qquad (2)$$

The particles $P0_k$, $P0_{k+1}$, $P0_{k+2}$, . . . may have a narrow size distribution. For example, more than 90% of the total mass of the particles may be represented by particles, whose mass is in the range of 70% to 150% of the average mass of the particles. For example, more than 90% of the total mass of the particles may be represented by particles, whose diameter is in the range of 70% to 150% of the mass median diameter of the particles.

Consequently, the mass $m_k$, $m_{k+1}$, $m_{k+2}$, . . . of each individual particle $P0_k$, $P0_{k+1}$, $P0_{k+2}$, . . . may be approximated by the average mass $m_{AVG}$:

$$m_k \approx m_{AVG} \qquad (3)$$

The square $(v_{RMS})^2$ of the RMS velocity $v_{RMS}$ may be defined and calculated by using the following equation:

$$v_{RMS}^2 = \frac{1}{N_{MEAS}} \sum_{k=1}^{N_{MEAS}} v_k^2 \qquad (4)$$

RMS means root mean square. The RMS velocity $v_{RMS}$ may be determined by analyzing images IMG2 captured during the measurement time period $T_{MEAS}$.

Combining the equations (2), (3), (4) may provide:

$$E_{MEAS} = N_{MEAS} \cdot \frac{1}{2} m_{AVE} \cdot v_{RMS}^2 \qquad (5)$$

The number of particles appearing in each captured image may be proportional to the instantaneous number density of particles of the jet. The number of sub-images $P1_k$, $P1_{k+2}$, $P_{k+2}$, . . . may be proportional to the instantaneous number density of particles of the jet. The number $N_{MEAS}$ may be determined by analyzing images IMG2 captured during the measurement time period $T_{MEAS}$.

The total number $N_{MEAS}$ may be estimated e.g. according to the following equation:

$$N_{MEAS} = \frac{C_g}{v_{AVE} \cdot d0} \cdot N_{IMG,AVE} \cdot T_{MEAS} \qquad (6)$$

$N_{IMG,AVE}$ may denote an average number of particles appearing in a single captured image. $C_g$ may denote a proportionality constant, i.e. a coefficient. The coefficient $C_g$ may depend e.g. on dimensions of the measuring region RG0 in the directions SX and SZ. The size of the measuring region RG0 may depend on the field of view of the imaging unit 200 and on the optical magnification of the imaging unit 200.

$v_{AVE}$ may denote the average velocity of the particles. To the first approximation, the number density of particles in the jet may be inversely proportional to the average velocity $v_{AVE}$ of the particles, in a situation where the mass flow rate of the particles is substantially constant.

d0 may denote the thickness of the measurement region RG0 in a direction, which is parallel to the optical axis AX2 of the imaging unit 200. To the first approximation, the relative fraction of particles passing through the reference area AREA0 without passing through the measurement region RG0 may be inversely proportional to the thickness d0 of the measurement region RG0.

The coefficient $C_g$ may also be determined experimentally e.g. by positioning an aperture to the jet, collecting all particles which pass through the aperture during a test period, determining the total mass of the collected particles by weighing, and by dividing the total mass by the average mass of single particles. The coefficient $C_g$ may be determined experimentally and/or theoretically for each measurement set-up.

Combining (5) with (6) gives:

$$E_{MEAS} = \frac{C_g}{v_{AVE} \cdot d0} \cdot N_{IMG,AVE} \cdot T_{MEAS} \cdot \frac{1}{2} m_{AVE} \cdot v_{RMS}^2 \qquad (7)$$

Equation (7) may be re-arranged e.g. into the following form:

$$E_{MEAS} = \frac{C_g}{d0} \cdot \frac{1}{2} m_{AVE} \cdot \frac{v_{RMS}^2}{v_{AVE}} \cdot N_{IMG,AVE} \cdot T_{MEAS} \qquad (8)$$

The values $N_{IMG,AVE}$, $v_{RMS}$, and $v_{AVE}$ associated with the measurement time period $T_{MEAS}$ may be determined by analyzing the images captured by the measuring device 500. The total energy $E_{MEAS}$ may be calculated from the values $N_{IMG,AVE}$, $v_{RMS}$, and $v_{AVE}$ e.g. by using the equation (8). A corresponding arc height value $h_{AS}$ may be subsequently estimated from the total energy $E_{MEAS}$ by using the model MODEL1.

The velocity value $v_{RMS}$ and the velocity value $v_{AVE}$ may be determined separately e.g. in order to improve the accuracy of the estimated energy value.

However, the velocity value $v_{RMS}$ may also be calculated from the velocity value $v_{AVE}$ by using information about the velocity probability distribution function. The velocity value $v_{AVG}$ may be calculated from the velocity value $v_{RMS}$ by using information about the velocity probability distribution function. The velocity probability distribution function may be measured e.g. by analyzing the captured images. The velocity probability distribution may also be assumed to match with a predetermined function. The velocity probability distribution may be assumed to match e.g. with a Gaussian function.

The model MODEL1 may also be determined based on the measured values $v_{RMS}$, $v_{AVE}$ and $N_{IMG,AVE}$ and based on one or more measured arc height values $h_{AS}$ such that it is not necessary to separately determine the value of the coefficient $C_g$. The contribution of the coefficient $C_g$ may be incorporated in the model by fitting the regression function to the experimentally measured data $v_{RMS}$, $v_{AVE}$, $N_{IMG,AVE}$, $h_{AS}$. The method may comprise determining a model $h_{AS}(N_{IMG,AVE}, v_{AVE}, v_{RMS})$ which may provide the arc height values as the function of the measured values $N_{IMG,AVE}, v_{AVE}, v_{RMS}$. The arc height value $h_{AS}$ may be subsequently estimated from the measured values $v_{RMS}$, $v_{AVE}$ and $N_{IMG,AVE}$, by using the model MODEL1.

Some particles of the jet JET0 may travel though the measurement region RG0 such that they are not directly detected by the measuring device 500. Some particles of the jet JET0 may travel though the measurement region RG0 such that the sub-images of those particles do not appear in any digital image captured by the imaging unit 200. Some particles may travel outside the depth of field (DoF) of the imaging unit 200. Some particles may travel through the measurement region RG0 when the jet is not illuminated by the illuminating unit. Some particles may travel through the measurement region REG0 when the image sensor SEN1 is not in the active light-detecting state, i.e. between two consecutive exposure time periods. The un-detected particles may be taken into consideration by using the coefficient $C_g$.

The number $N_{MEAS}$ may also be determined e.g. by measuring the mass flow and/or volumetric flow of the particles supplied to the shot peening unit 700. The number $N_{MEAS}$ may also be determined e.g. by collecting and weighing the particles after they have been accelerated by the shot peening unit 700. However, even in that case determining the particle density from the captured images may improve the reliability of the method.

A shot peening process may need to be verified when producing critical parts. A shot peening process may need to be verified e.g. when producing critical parts of an airplane. Shot peening may e.g. relieve tensile stresses built up in a grinding or welding process and replace them with beneficial compressive stresses. Depending on the part geometry, part material, shot material, shot quality, shot intensity, and shot coverage, shot peening may increase fatigue life e.g. more than 100%, or even more than 1000%.

Figure 6D:
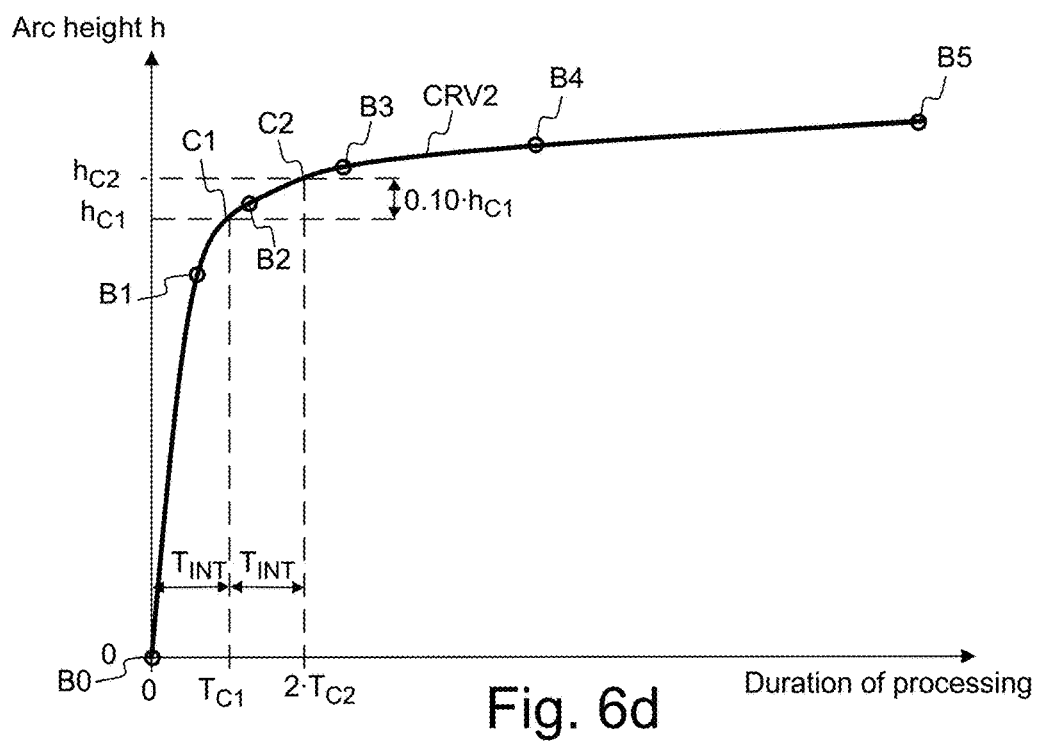
FIG. 6d shows, by way of example, determining a time equivalent value ($T_{INT}$) based on arc height values.

FIG. 6d shows, by way of example, the effect of processing time on the arc height value of a test strip AS1. The curve CRV2 may depict the arc height value $h_{AS}$ as the function of duration of the shot peening, when using a first set of operating parameters. The curve CRV2 may be determined experimentally by using the test strips AS1 and/or by using the model MODEL1. For example, the points B1 to B5 shown in FIG. 6d may be measured experimentally by using the test strips AS1.

The curve CRV2 has a first point C1 and a second point C2. The points C1 and C2 may be determined by using the model MODEL1. The first point C1 has an arc height value $h_{C1}$, and the second point C2 has an arc height value $h_{C2}$. The first point C1 is attained at the processing time $T_{C1}$, and the second point C2 is attained at the processing time $T_{C2}$.

The points C1 and C2 may be selected such that the following two conditions are simultaneously fulfilled:

$$\frac{h_{C2}-h_{C1}}{h_{C1}}=0.1 \quad (9a)$$

$$T_{C2}-T_{C1}=T_{C1} \quad (9b)$$

When the points have been selected such that the equations (9a) and (9b) are fulfilled, then the value $T_{C1}$ is equal to a time equivalent value $T_{INT}$ of the shot peening process, when using said first set of operating parameters. The time equivalent value $T_{INT}$ may also be called e.g. as the "intensity" of the particle jet JET0. The time equivalent value $T_{INT}$ may also be called e.g. as the "peening intensity rating". The peening intensity rating $T_{INT}$ may be valid for said first set of operating parameters, at the position of the reference area AREA0. Each peening intensity rating $T_{INT}$ may be associated with a specified position and with a specified set of operating parameters.

Figure 7A:
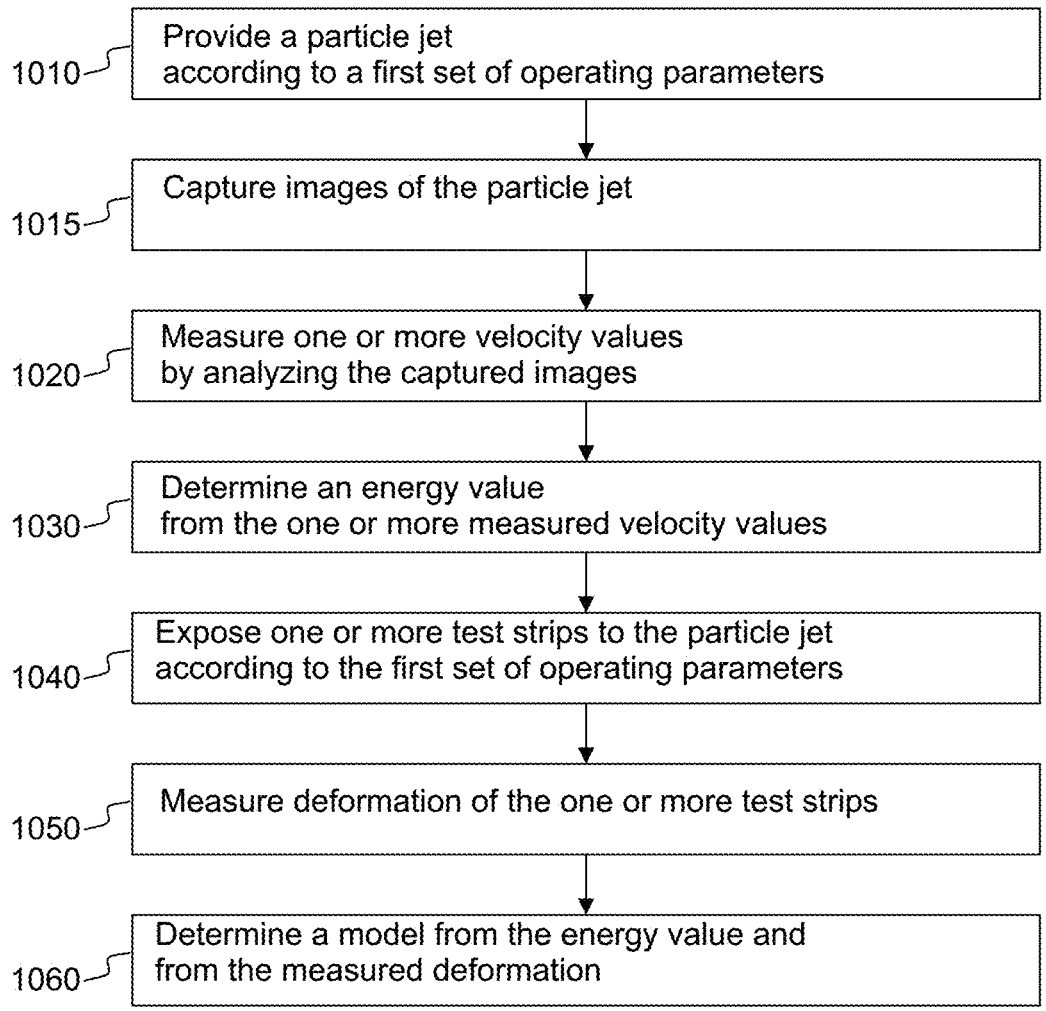
FIG. 7a shows, by way of example, method steps for determining a model.

FIG. 7a shows, by way of example, method steps for determining a model MODEL1, which may define a relationship between measured velocity values and corresponding deformation values.

The particle jet JET0 may be provided according to a first set of operating parameters (step 1010). For example, the pressure $p_{ACC}$ of accelerating gas may be set to a first value.

A plurality of images of the particle jet may be captured (step 1015) when the particle jet JET0 is provided according to the first set of operating parameters.

One or more velocity values (e.g. $v_{RMS}$, $v_{AVG}$) may be determined by analyzing the captured images (step 1020). The velocity distribution and the particle density may be determined by analyzing the captured images. The energy flux and/or total energy may be determined from the one or more measured velocity values (step 1030).

One or more test strips AS1 may be exposed to the particle jet JET0 when the particle jet JET0 is provided according to said first set of operating parameters (step 1040).

A deformation value may be obtained by measuring the deformation of a test strip AS1 after it has been exposed to the particle jet JET0. The deformation value may be e.g. an arc height value ($h_{AS}$).

One or more deformation values may be obtained by measuring the deformation of one or more test strips AS1. For example, a first test strip may be exposed to the particle jet during a first time period, and a second test strip may be exposed to the particle jet during a second time period.

The model MODEL1 may be determined by fitting one or more parameters of a regression function to the measured deformation value and to the one or more measured velocity values (step 1060). An energy value may be determined from the one or more measured velocity values. The model MODEL1 may be determined by fitting one or more parameters of a regression function to the measured deformation value and to the energy value.

The step 1040 may be performed after performing the step 1015 or before performing the step 1015. The steps 1015 and 1040 may also be performed simultaneously. Performing the step 1015 may temporally overlap performing the step 1040.

Figure 7B:
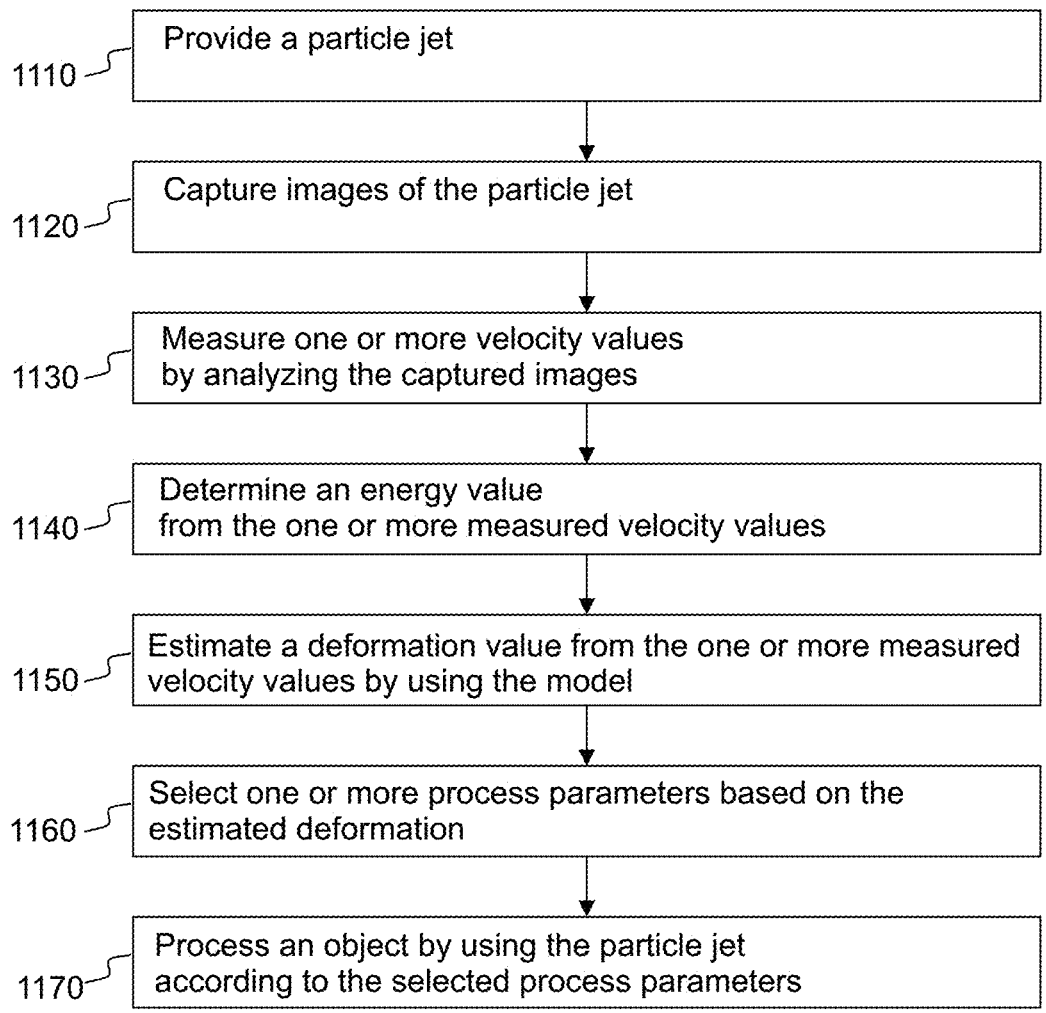
FIG. 7b shows, by way of example, selecting a process parameter based on measurement results obtained by analyzing the captured images.

FIG. 7b shows, by way of example, controlling the shot peening process based on the one or more measured velocity values.

The particle jet JET0 may be provided in step 1110.

A plurality of images of the particle jet may be captured in step 1120.

One or more velocity values (e.g. $v_{RMS}$, $v_{AVG}$) may be determined by analyzing the captured images (step 1130). The energy flux and/or total energy may be determined from the one or more velocity values (e.g. $v_{RMS}$, $v_{AVG}$), in step 1140. The velocity distribution and/or the particle density may be determined by analyzing the captured images.

A deformation value may be estimated from the measured velocity distribution and from the measured particle density by using the model MODEL1 (step 1150). The deformation value may be e.g. an arc height value ($h_{AS}$).

The length of a processing time period may be selected according to the estimated deformation value (step 1160).

A value of an operating parameter may also be selected based on the estimated deformation value in step 1160. For example the pressure of accelerating gas may be selected and/or adjusted based on the estimated deformation value.

The surface SRF2 of an object OBJ1 may subsequently be processed according to the selected length of a processing time period (step 1170).

Figure 7C:
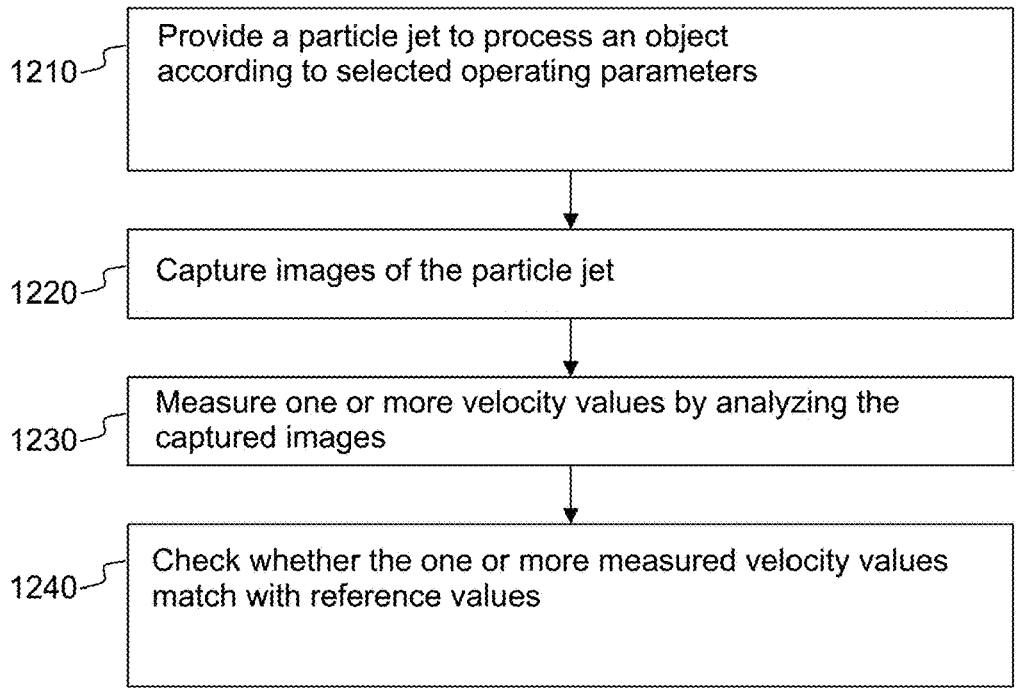
FIG. 7c shows, by way of example, method steps for verifying a shot peening process.

FIG. 7c shows, by way of example, method steps for verifying the shot peening capability of a particle jet JET0.

The particle jet may be provided according to selected operating parameters (step 1210).

A plurality of images IMG2 may be captured by the imaging device 500 (step 1220). The particle jet JET0 may be illuminated with a sequence SEQ1 of illuminating light pulses such that a captured image IMG2 comprises two or more adjacent sub-images of the same particle. In particular, the particle jet JET0 may be illuminated with a sequence SEQ1 of illuminating light pulses such that a captured image IMG2 comprises three or more adjacent sub-images of the same particle.

One or more velocity values (e.g. $v_{RMS}$, $v_{AVG}$) may be determined by analyzing the captured images (step 1230).

The velocity distribution and the particle density may be determined by analyzing the captured images. The energy flux and/or total energy may be determined from the one or more measured velocity values. The images may be captured when the shot peening unit 700 is operated according to said selected operating parameters.

The measured values obtained by analyzing the images may be compared with one or more reference values in order to check whether the shot peening capability of the jet is in a predetermined range (step 1240).

An energy value may be determined by analyzing the captured images, and a deformation value may be determined from the energy value by using the model MODEL1. The deformation value may be compared with a reference value in order to check whether the shot peening capability of the jet is in a predetermined range. The deformation value may be e.g. arc height value $h_{AS}$ or a time equivalent value $T_{INT}$. The energy value may represent e.g. the flux of kinetic energy of particles passing through the reference area AREA0 or the total kinetic energy of particles passing through the reference area AREA0 during a predetermined time period. The method may comprise determining the energy value from the measured velocity distribution and from the measured particle distribution.

A deformation value may be determined from the measured velocity distribution and the particle distribution by using the model MODEL1, and the deformation value may be compared with a reference value in order to check whether the shot peening capability of the jet is in a predetermined range. The deformation value may be e.g. arc height value $h_{AS}$ or a time equivalent value $T_{INT}$.

The method may comprise:
providing a model (MODEL1) which establishes a relationship between a velocity value ($v_{AVE}$, $v_{RMS}$) of a particle jet (JET0) and a deformation value ($h_{AS}$),
using a first shot peening unit (700) to provide a particle jet (JET1),
illuminating at least a portion (RG0) of the particle jet (JET0) with illuminating light (LB0),
capturing images (IMG2) of said portion (RG0),
determining a velocity value ($v_{AVE}$, $v_{RMS}$) of particles (P0) of the particle jet (JET1) by analyzing the captured images (IMG2),
determining an estimate of an arc height value ($h_{AS}$) from the velocity value ($v_{AVE}$, $v_{RMS}$) by using the model (MODEL1), and
classifying a shot peening operation as valid or invalid by comparing the estimate of the arc height value ($h_{AS}$) with one or more reference values.

The method may comprise:
providing a model (MODEL1) which establishes a relationship between a velocity value ($v_{AVE}$, $v_{RMS}$) of a particle jet (JET0) and a deformation value ($h_{AS}$),
using a first shot peening unit (700) to provide a particle jet (JET1),
illuminating at least a portion (RG0) of the particle jet (JET0) with illuminating light (LB0),
capturing images (IMG2) of said portion (RG0),
determining a velocity value ($v_{AVE}$, $v_{RMS}$) of particles (P0) of the particle jet (JET1) by analyzing the captured images (IMG2),
determining an estimate of an arc height value ($h_{AS}$) from the velocity value ($v_{AVE}$, $v_{RMS}$) by using the model (MODEL1), and
classifying a shot peening operation as valid or invalid by checking whether the estimate of the arc height value ($h_{AS}$) is in a predetermined range.

The estimate may be compared with one or more reference values in order to determine whether the estimate is in the predetermined range. The shot peening operation may refer to a method which comprises operating the first shot peening unit (700) according to a specified set of operating parameters during a specified time period.

An energy value may be determined by analyzing the captured images, and the energy value may be compared with a reference value in order to check whether the shot peening capability of the jet is in a predetermined range. The deformation value may be e.g. arc height value $h_{AS}$ or a time equivalent value $T_{INT}$.

The measured velocity distribution may be compared with one or more first reference values, and/or the measured particle distribution may be compared with one or more second reference values in order to check whether the shot peening capability of the jet is in a predetermined range.

Figure 7D:
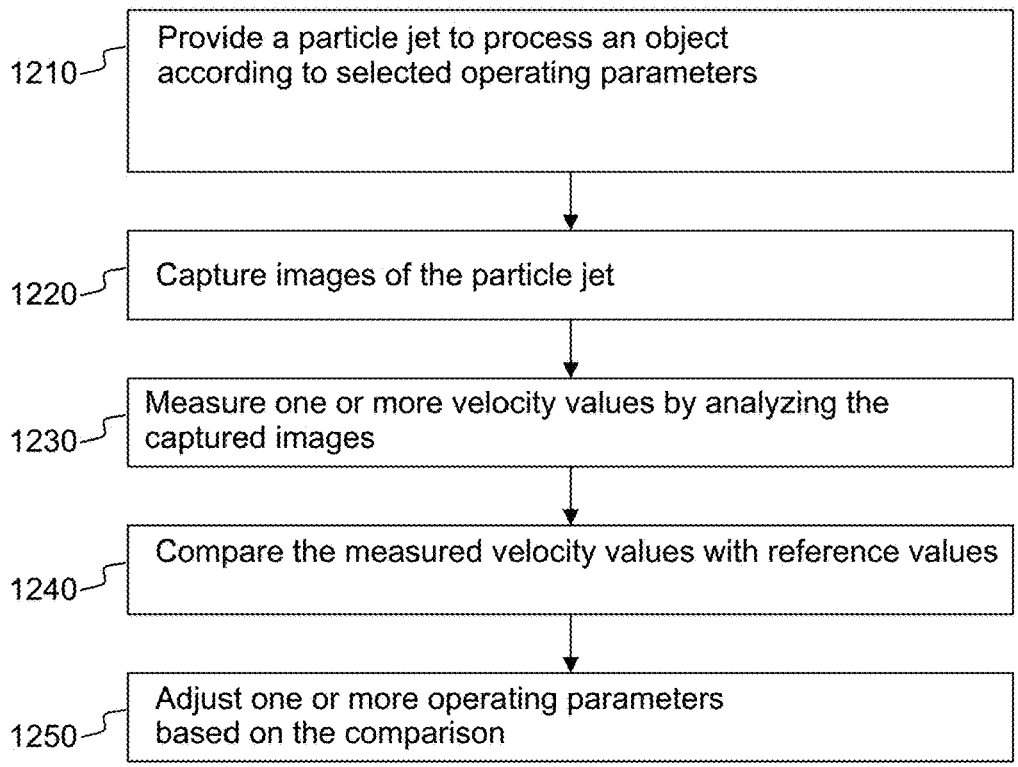
FIG. 7d shows, by way of example, method steps for controlling shot peening based on measurement results obtained by analyzing the captured images.

FIG. 7d shows, by way of example, method steps for controlling operation of a shot peening unit 700.

The steps 1210, 1220, 1230 and 1240 may be performed as discussed above with reference to FIG. 7c. The method may further comprise adjusting one or more operating parameters of the shot peening process based on the comparison (step 1250).

The adjustable and/or selectable parameters of the shot peening process may comprise e.g. one or more of the following:
pressure $p_{acc}$ of accelerating gas,
(mass) flow rate of accelerating gas,
(mass) flow rate of particles P0 passing via an accelerating nozzle of the shot peening unit 700,
length of a processing time period,
relative transverse movement speed of the axis of the jet with respect to the object,
distance L2 between the nozzle of the shot peening unit 700 and the object OBJ1.

The velocity of a particle may have significant transverse component, i.e. the velocity is not always parallel with the axis AX0 of the jet. The velocity $v_k$ of a particle may have an axial component $v_{k,z}$ and a transverse component $v_{k,y}$. The axial component $v_{k,z}$ is parallel with the axis AX0, and the transverse component $v_{k,y}$ is perpendicular to the axis AX0. When evaluating the shot peening capability, the kinetic energy of each particle may be calculated from the axial component $v_{k,z}$, by omitting the transverse component $v_{k,y}$. The capability of a particle $P0_k$ to deform a surface SRF1 may mainly depend on the axial velocity component $v_{k,z}$ of said particle. The velocity values ($v_{RMS}$, $v_{AVE}$) used e.g. in equations (1) to (8) may be determined from the axial velocity values $v_z$ of the individual particles P0. The axial velocity values $v_z$ of the individual particles P0 may be determined from the captured images.

The velocity of an individual particle $P0_k$ may also be determined by capturing a first image by using first single illumination pulse at a time t1, and capturing a second image by using a second single illumination pulse at a time t2. The first image may comprise a first sub-image $P1_{k,t1}$ of the particle $P0_k$. The second image may comprise a second sub-image $P1_{k,t2}$ of the particle $P0_k$. The spatial displacement $\Delta u_k$ associated with the particle $P0_k$ may be determined by comparing the first image with the second image. The velocity of the particle $P0_k$ may be determined from the displacement $\Delta u_k$ and from the time difference $t2-t1$.

The method may comprise determining an angular divergence of the particle jet JET0 by analyzing the captured images IMG1.

The method may comprise determining a width and/or a radial dimension of the particle jet JET0 by analyzing the captured images IMG1.

Shot peening may be used e.g. for processing a gear part, camshaft, clutch spring, coil spring, leaf spring, suspension spring, connecting rod, crankshaft, gearwheel, part of an aircraft, part of a landing gear, components of an engine of an aircraft, engine housing, rock drill and/or turbine blade.

For the person skilled in the art, it will be clear that modifications and variations of the devices and the methods according to the present invention are perceivable. The figures are schematic. The particular embodiments described above with reference to the accompanying drawings are illustrative only and not meant to limit the scope of the invention, which is defined by the appended claims.

The invention claimed is:

1. A method, comprising:
   using a first shot peening unit to provide a particle jet,
   exposing one or more test strips to the particle jet such that the first shot peening unit provides a particle jet according to a first set of operating parameters,
   measuring one or more first deformation values of the test strips,
   illuminating at least a portion of the particle jet with illuminating light,
   capturing images of said portion during a measurement time period, wherein the first shot peening unit provides a particle jet according to said first set of operating parameters during said measurement time period,
   determining at least one velocity value of particles of the particle jet by analyzing the captured images, and
   determining a model based on the one or more first deformation values and based on the at least one velocity value.

2. The method of claim 1, comprising illuminating a measurement portion of the particle jet with illuminating light pulses, and focusing light reflected and/or scattered from the particles to an image sensor.

3. The method of claim 2 comprising illuminating the particle jet with a sequence of illuminating light pulses such that a captured image comprises two or more adjacent sub-images of the same particle.

4. The method of claim 2 comprising illuminating the particle jet with a sequence of illuminating light pulses such that a captured image comprises three or more adjacent sub-images of the same particle.

5. The method according to claim 1 comprising illuminating the particle jet with the illuminating light such that the thickness of said portion is smaller than the diameter of the particle jet.

6. A method, comprising:
   providing a model which establishes a relationship between a velocity value of a particle jet and a deformation value,
   using a first shot peening unit to provide a particle jet,
   illuminating at least a portion of the particle jet with illuminating light,
   capturing images of said portion,
   determining one or more velocity values of particles of the particle jet by analyzing the captured images,
   determining an estimate of an arc height value from the one or more velocity values by using the model, and
   classifying a shot peening operation as valid or invalid by checking whether the estimate of the arc height value is in a predetermined range.

7. An apparatus, comprising:
   an illuminating unit to provide an illuminating light beam,
   an image sensor to capture images of a particle jet illuminated by the illuminating light beam, and
   an interface to receive one or more deformation values,
   wherein the apparatus is configured to determine one or more velocity values of particles of the particle jet by analyzing the captured images, and to determine a model based on the one or more first deformation values and based on the one or more velocity values.

8. The apparatus of claim 7, wherein the illuminating unit is arranged to provide a pulse sequence, which comprises two or more illuminating light pulses.

* * * * *